Jan. 20, 1942.   L. E. POOLE ET AL   2,270,472
MACHINE FOR MANUFACTURING ARMATURES WITH BAR WINDINGS
Filed July 29, 1940   22 Sheets-Sheet 3
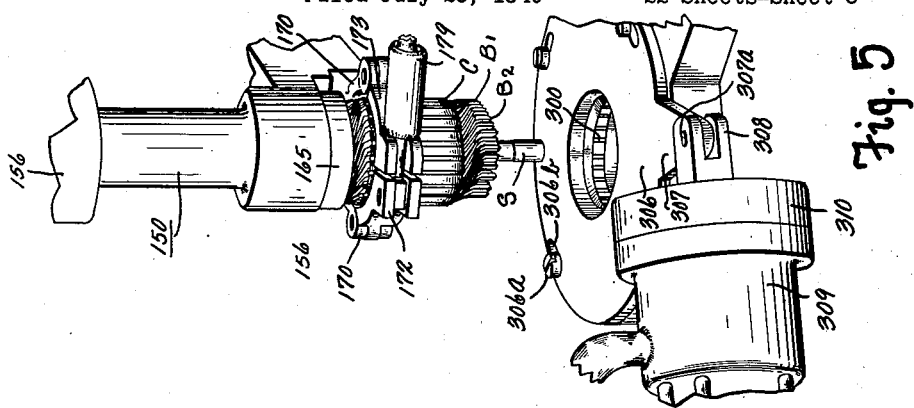
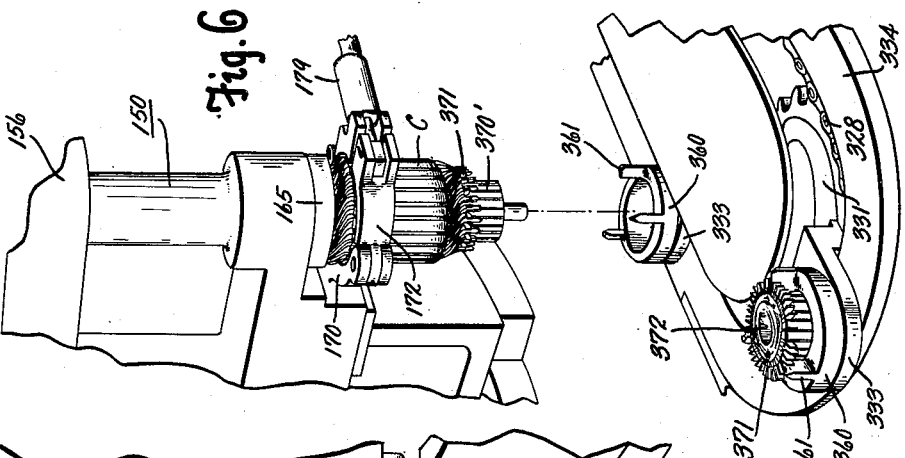
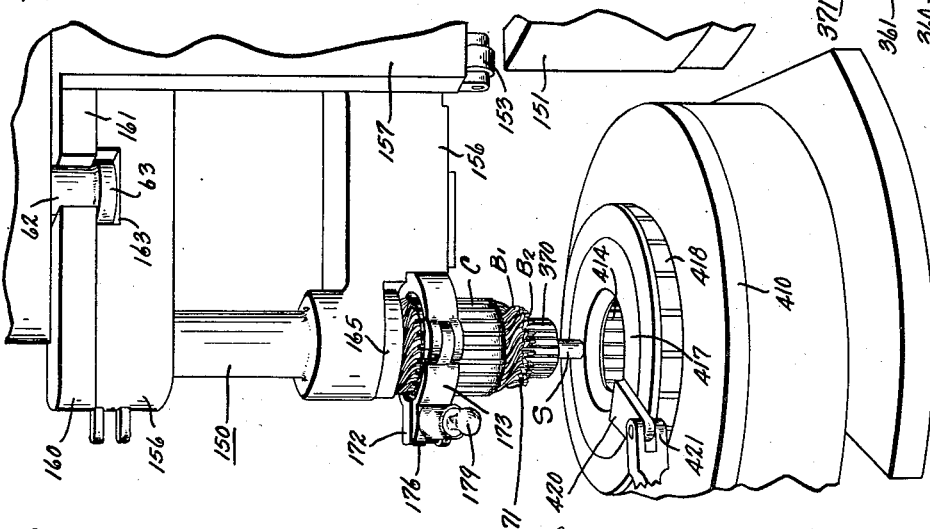
INVENTORS
Lora E. Poole and Ernest R. Fausset
BY
Spencer Hardman & Fehr
their ATTORNEYS

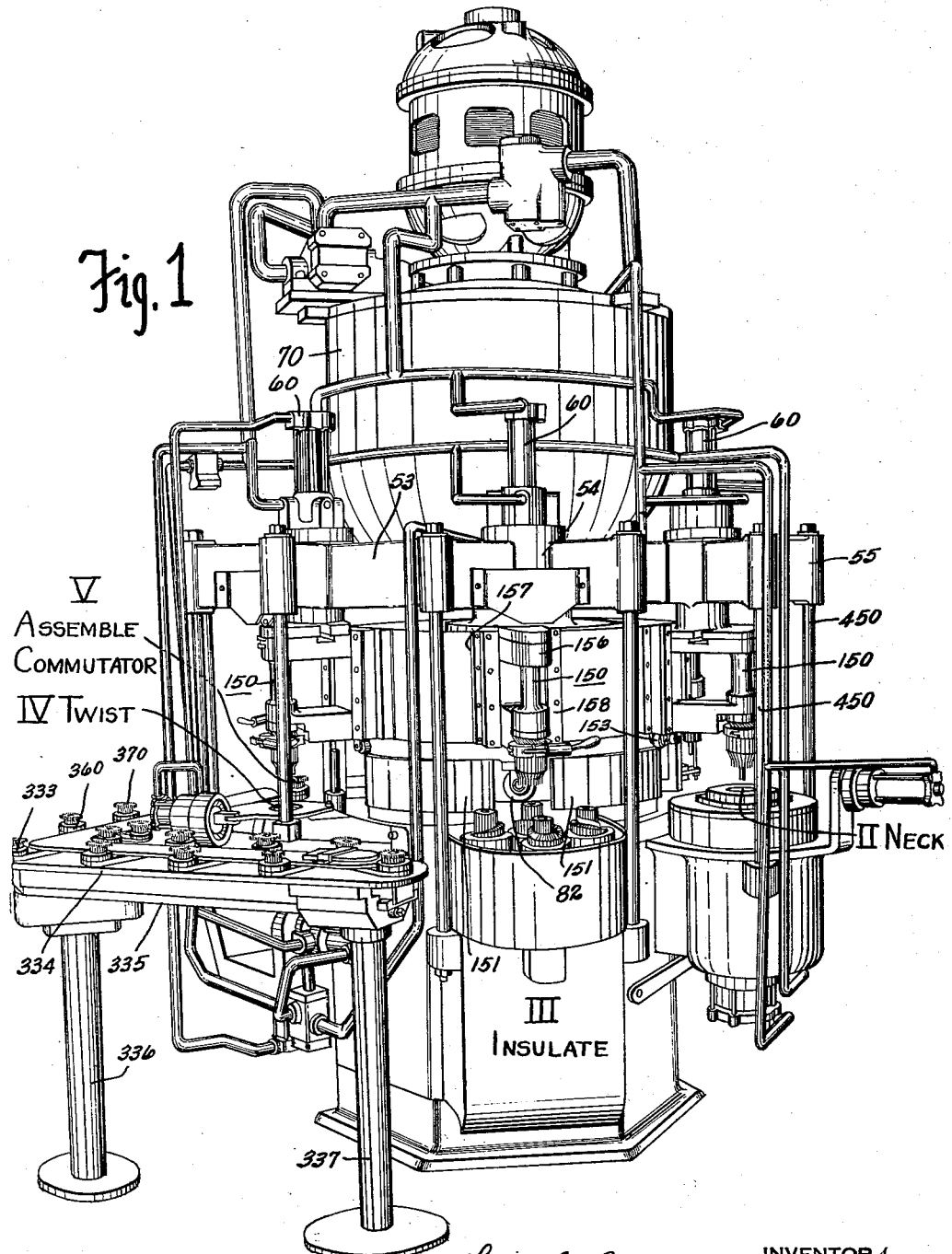

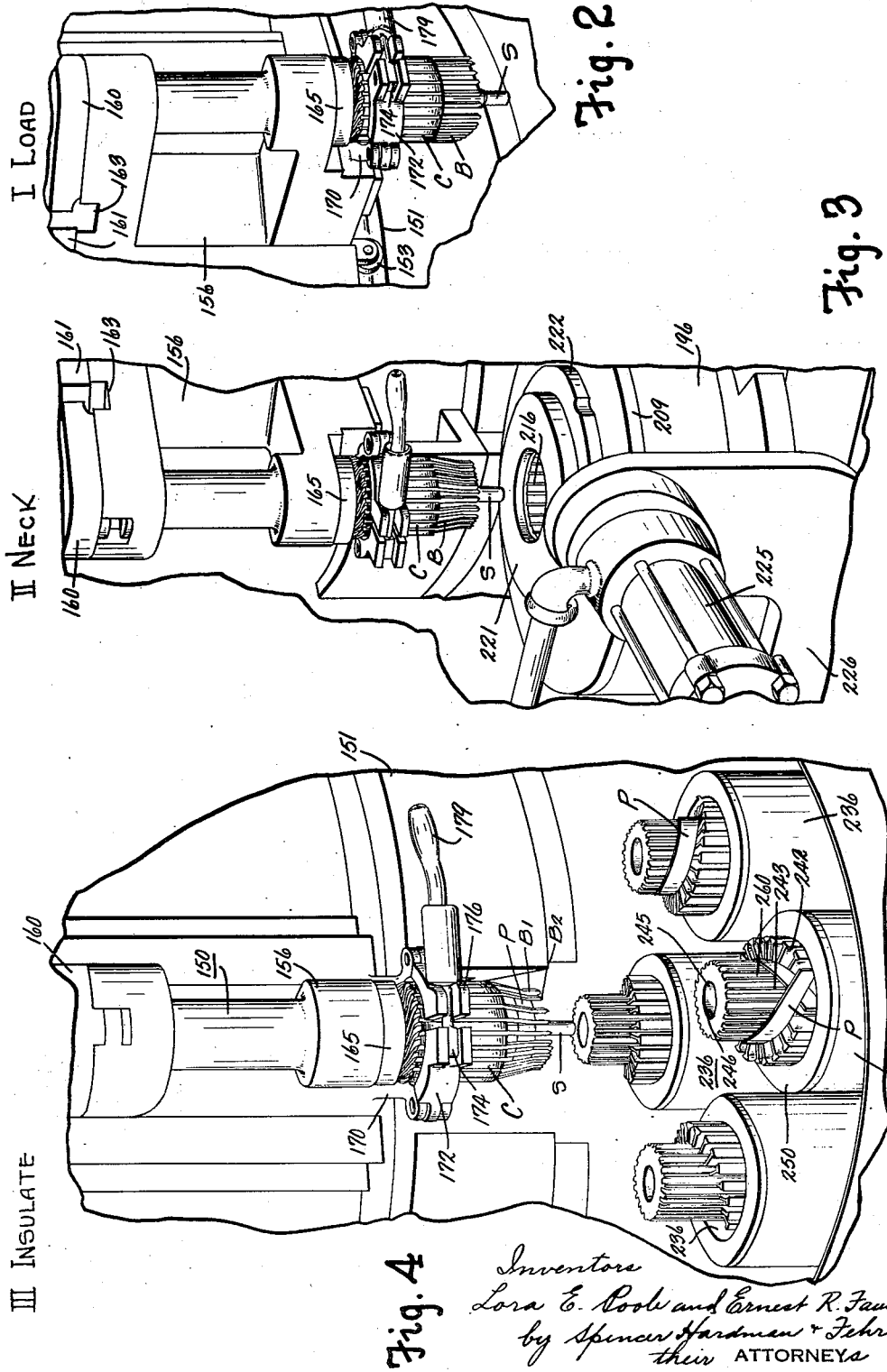

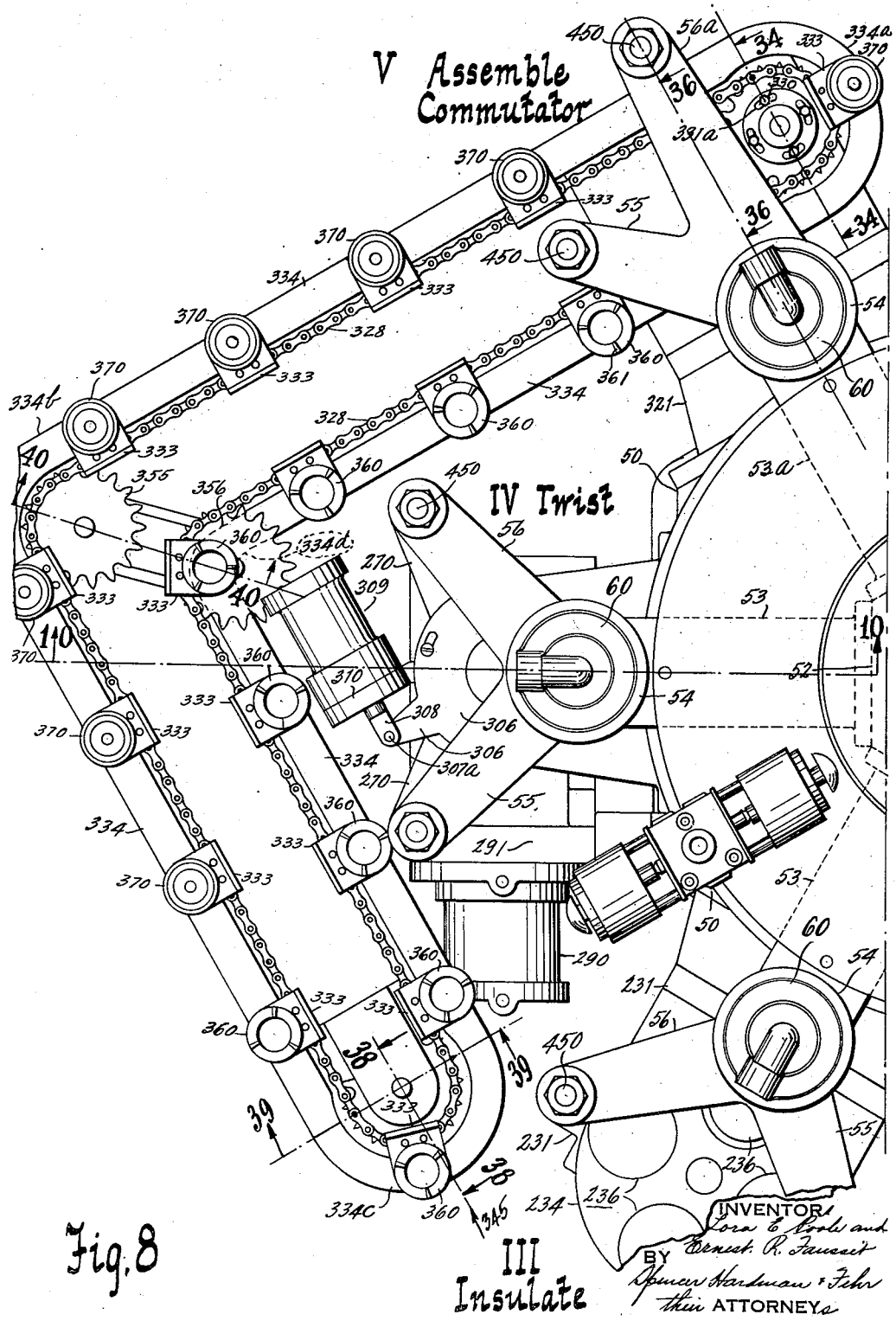

Jan. 20, 1942.  L. E. POOLE ET AL  2,270,472
MACHINE FOR MANUFACTURING ARMATURES WITH BAR WINDINGS
Filed July 29, 1940   22 Sheets-Sheet 7
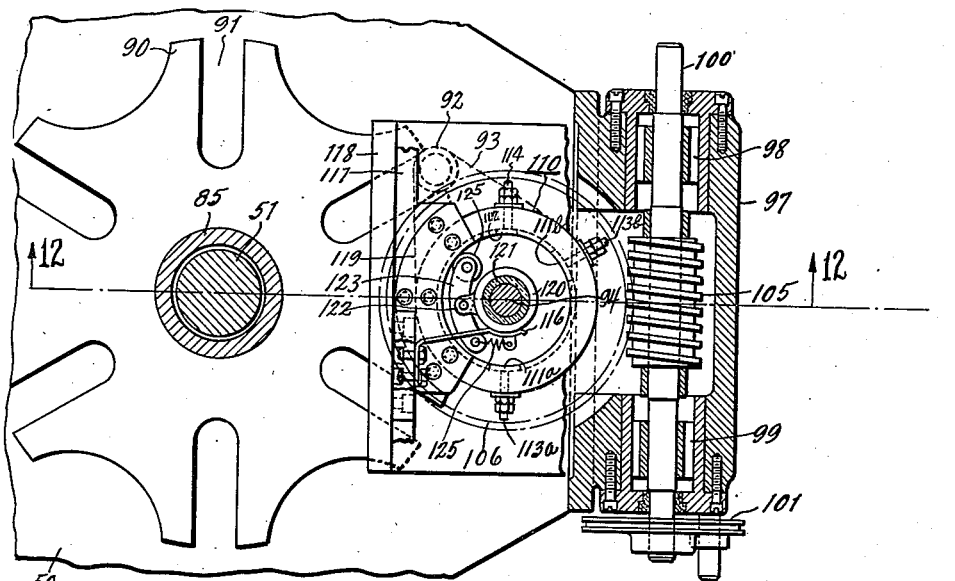
Fig.11
Fig.11a
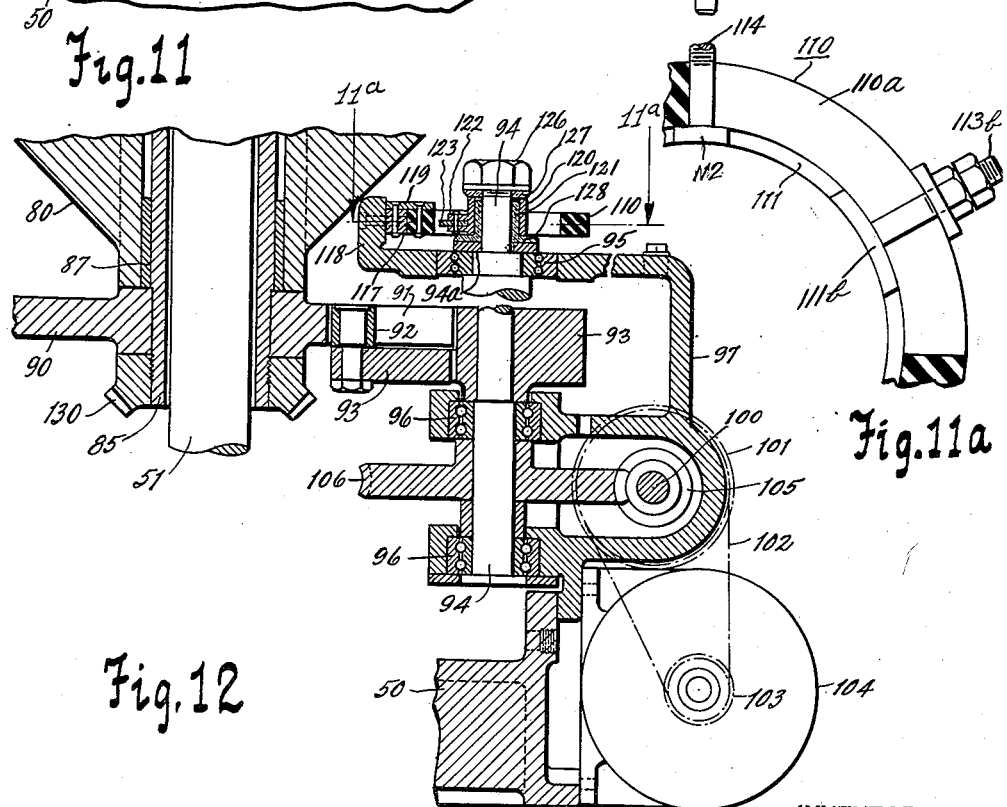
Fig.12
INVENTORS
Loran E. Poole and
Ernest R. Fausset
BY
Spencer Hardman & Fehr
their ATTORNEYS

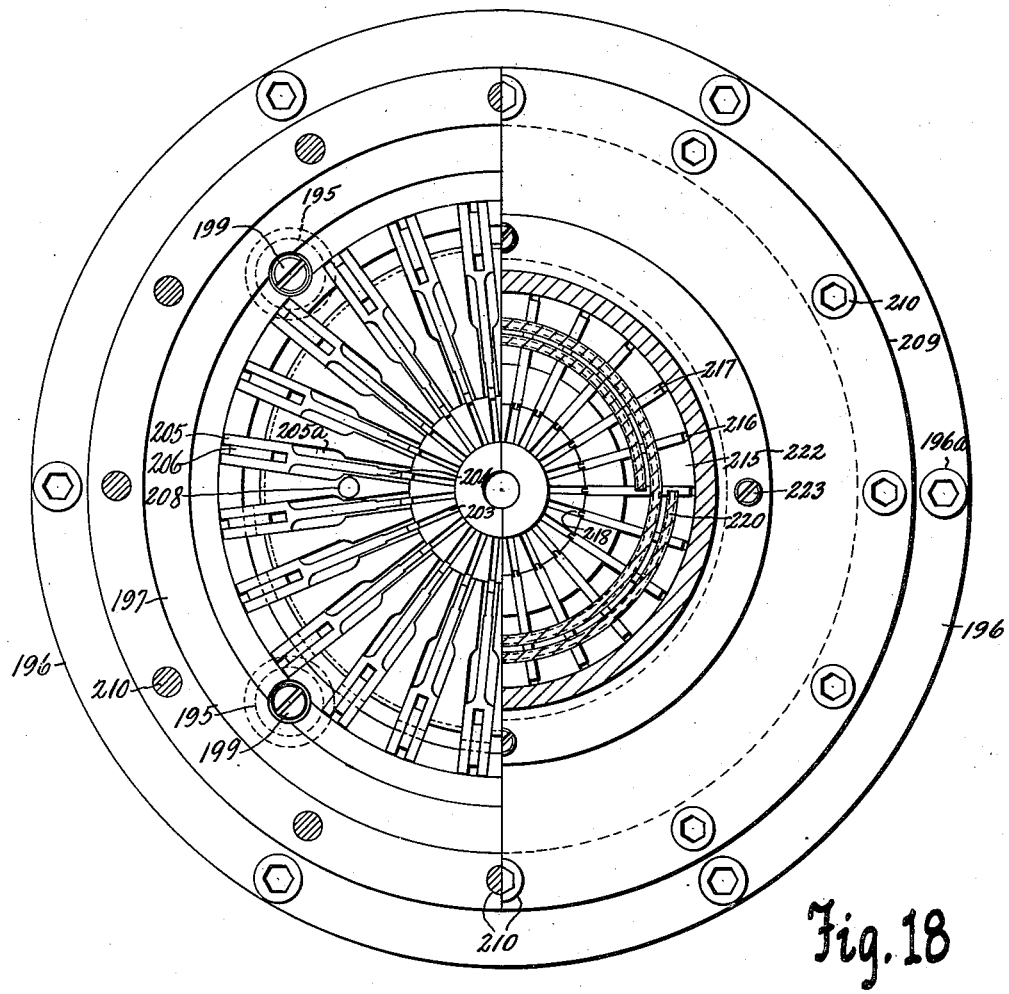
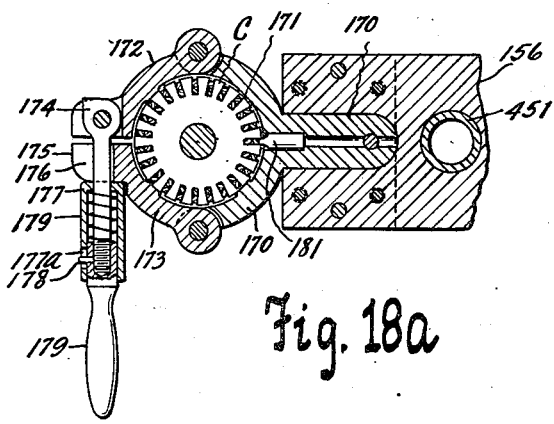
Fig. 18
Fig. 18a

III Insulate

Jan. 20, 1942.    L. E. POOLE ET AL    2,270,472
MACHINE FOR MANUFACTURING ARMATURES WITH BAR WINDINGS
Filed July 29, 1940    22 Sheets-Sheet 15

INVENTORS
Lora E. Poole and
Ernest R. Fausset
BY
Spencer Hyndman & Fehr
their ATTORNEYS

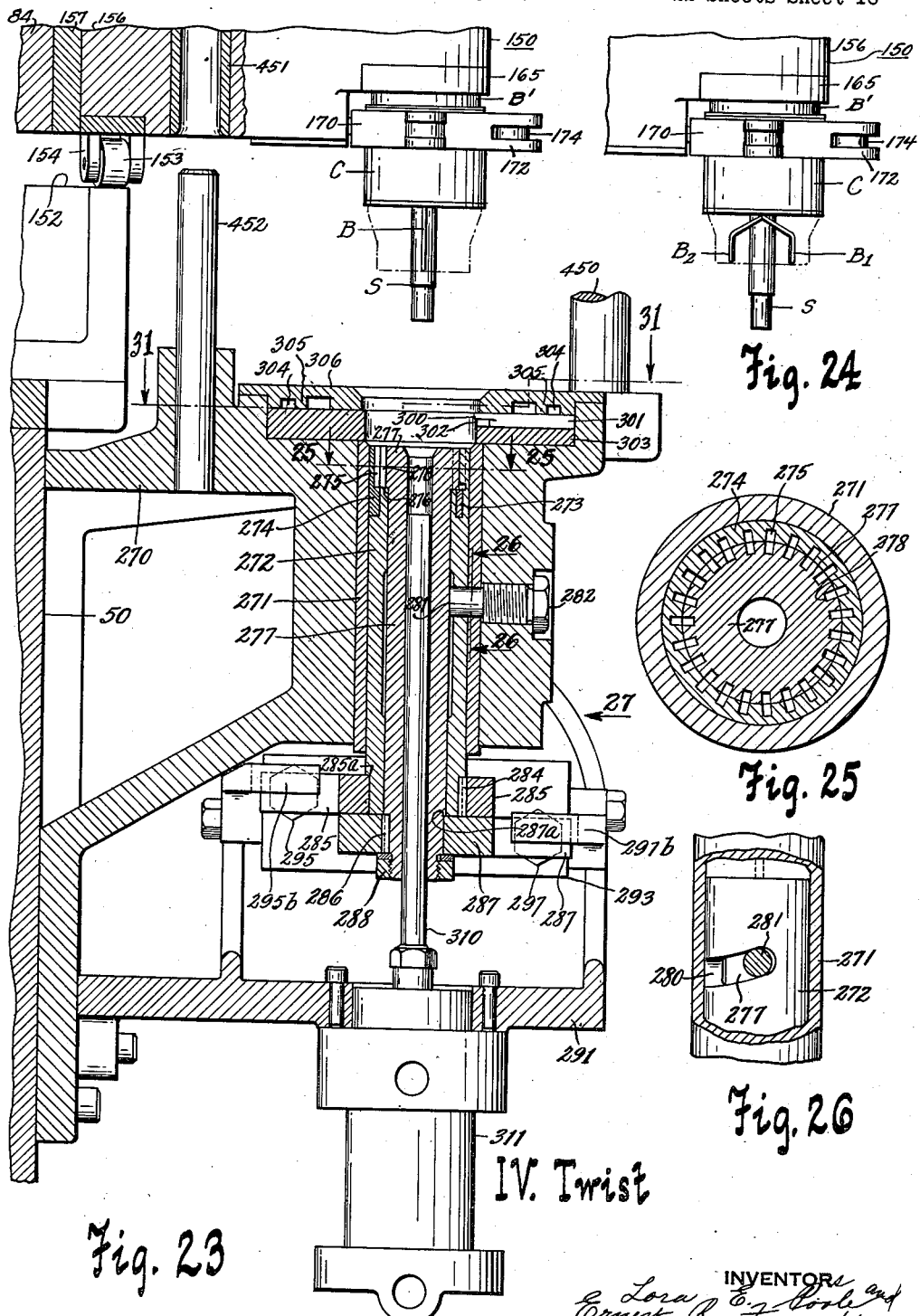

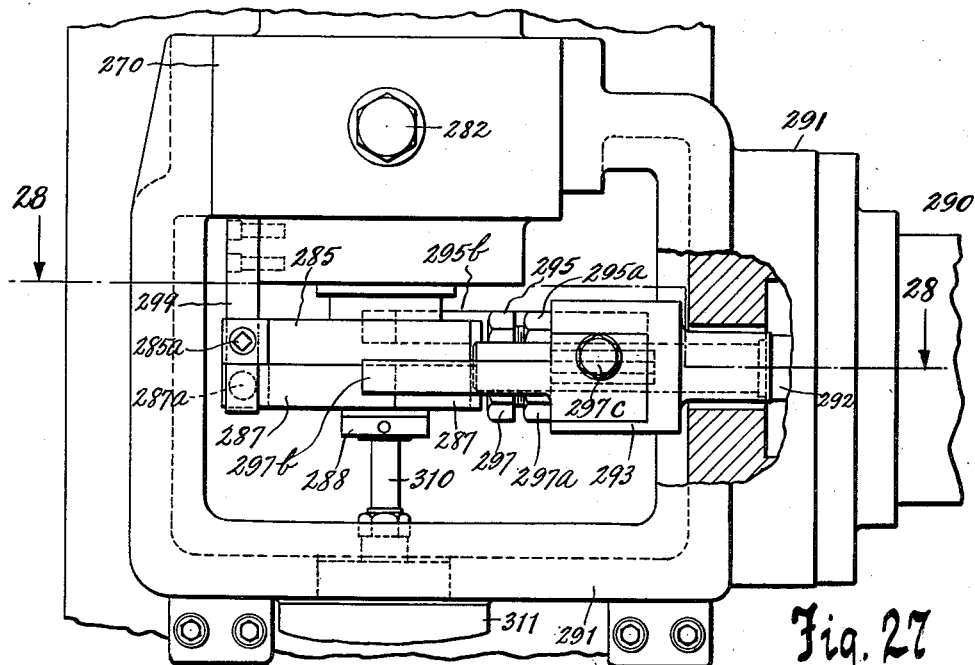
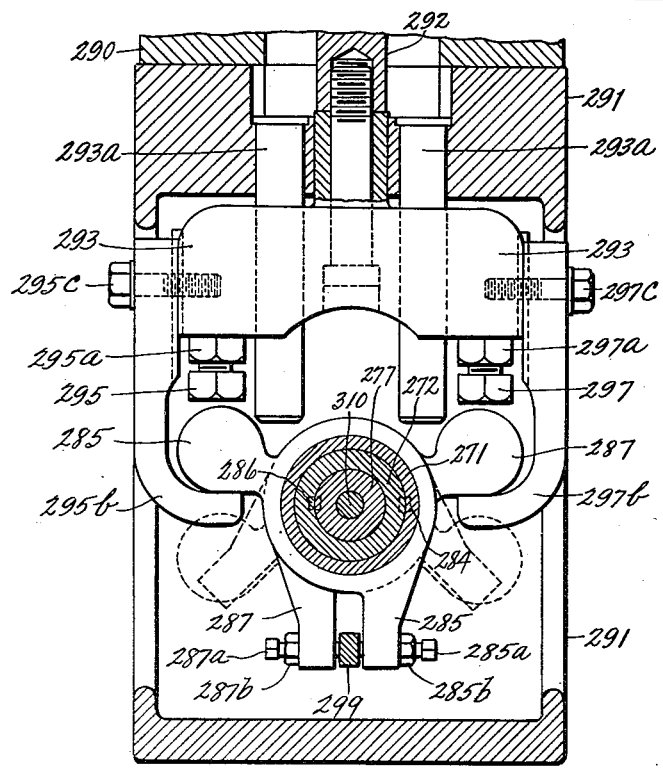
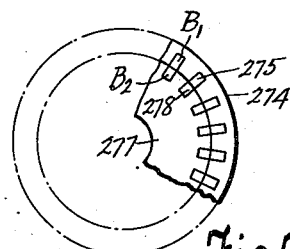
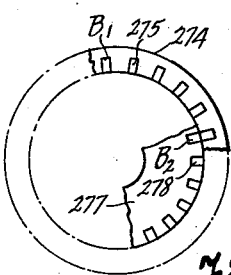

Jan. 20, 1942. L. E. POOLE ET AL 2,270,472
MACHINE FOR MANUFACTURING ARMATURES WITH BAR WINDINGS
Filed July 29, 1940 22 Sheets-Sheet 18
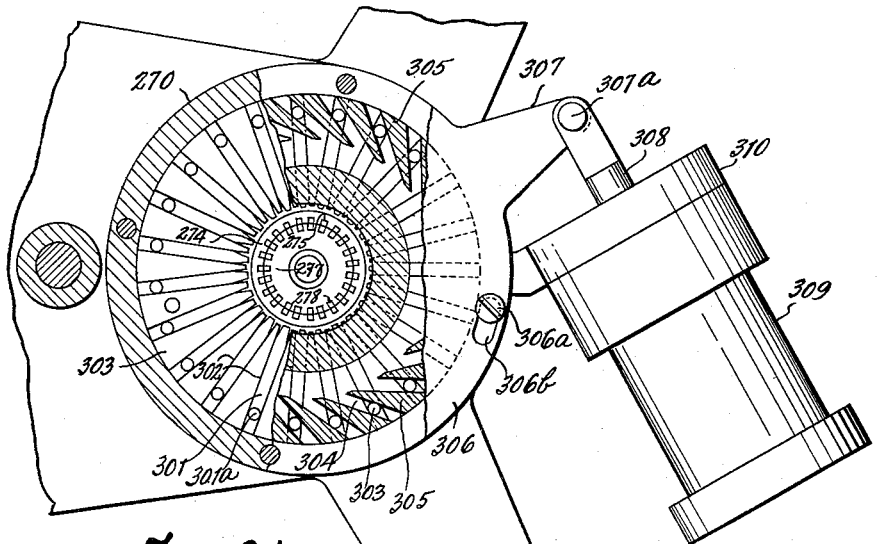
Fig. 31
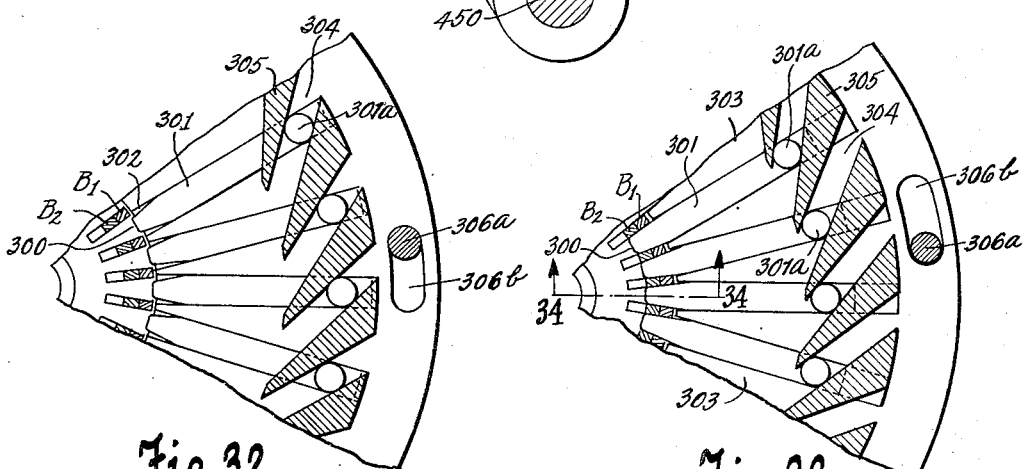
Fig. 32
Fig. 33
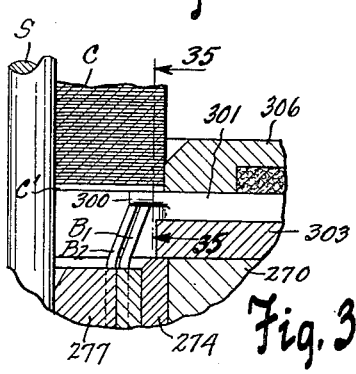
Fig. 34
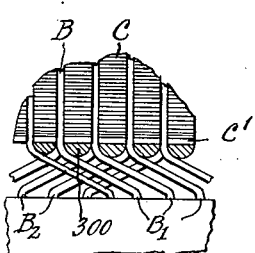
Fig. 35
INVENTORS
Lora E. Poole and
Ernest R. Fausset
BY
Spencer Hardman & Fehr
their ATTORNEYS Jan. 20, 1942.  L. E. POOLE ET AL  2,270,472
MACHINE FOR MANUFACTURING ARMATURES WITH BAR WINDINGS
Filed July 29, 1940  22 Sheets-Sheet 19
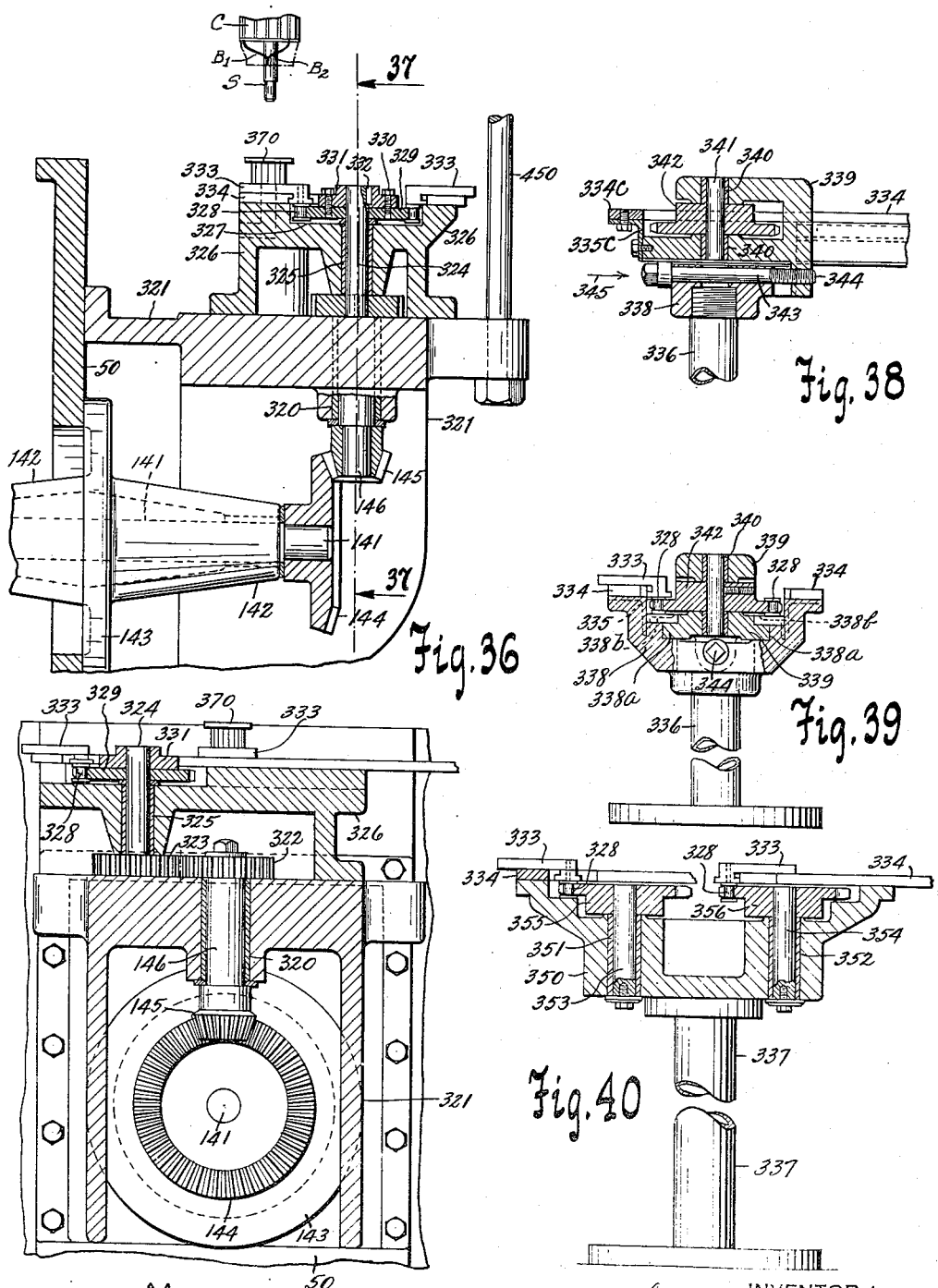

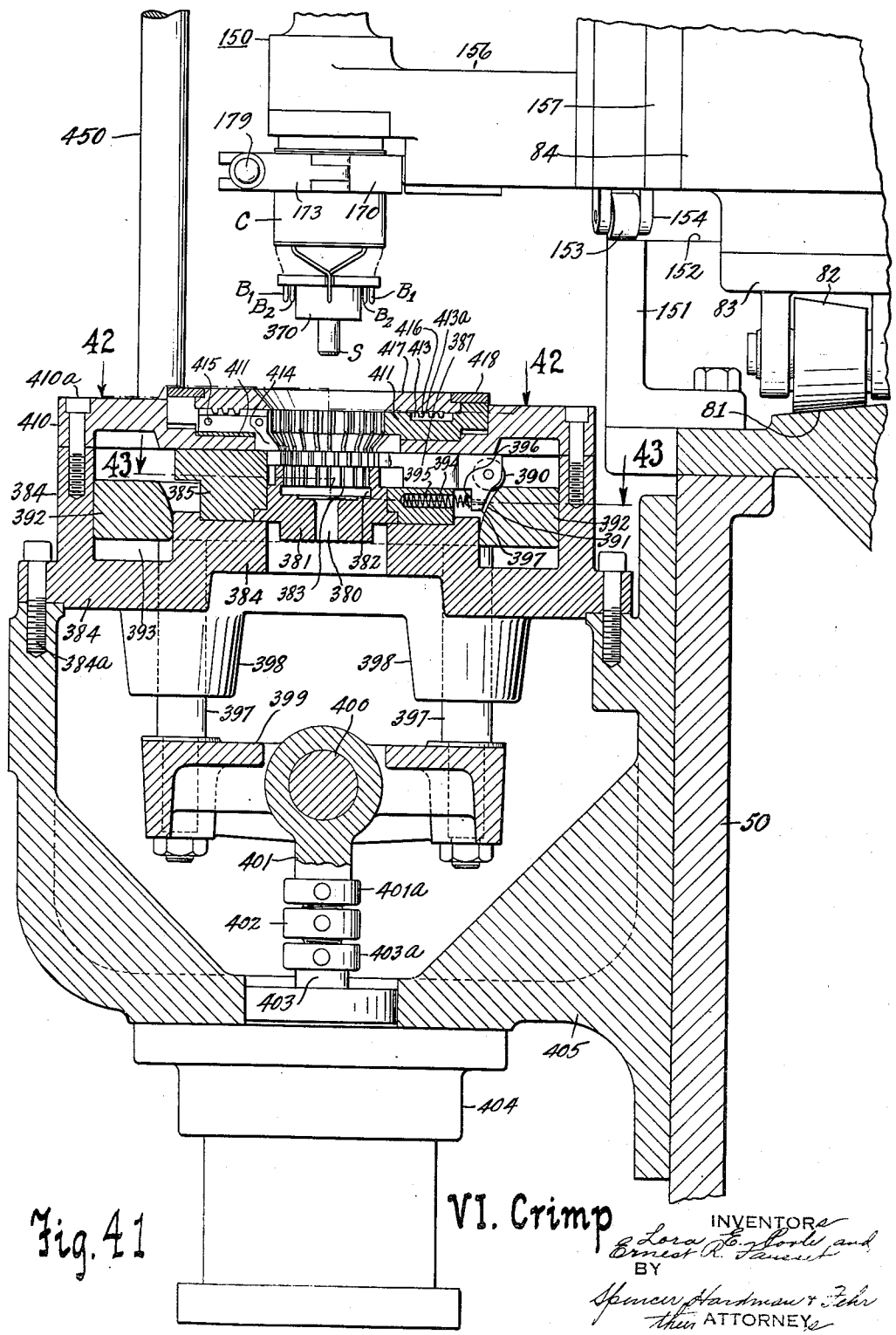
Fig. 41  VI. Crimp

Patented Jan. 20, 1942

2,270,472

UNITED STATES PATENT OFFICE 2,270,472

MACHINE FOR MANUFACTURING ARMATURES WITH BAR WINDINGS

Lora E. Poole and Ernest R. Fausset, Anderson, Ind., assignors to General Motors Corporation, Detroit, Mich., a corporation of Delaware Application July 29, 1940, Serial No. 348,086

32 Claims. (Cl. 29—33)

This invention relates to the manufacture of bar-wound armatures for dynamo electric machines particularly for series electric motors used for starting internal combustion engines.

A bar-wound armature is one which comprises an armature core upon which a plurality of single turn coils of relatively stiff wire are mounted. A single turn bar winding is generally known as a hair pin, since it comprises an intermediate yoke portion joining parallel portions providing the active coil sides of the winding. The type of hairpin armature winding to which the present invention relates and a machine for making the same are disclosed in Lora E. Poole Patent No. 1,834,733, patented December 1, 1931.

In the manufacture of starting motor armatures with hairpin winding, it has been the practice heretofore to carry on various steps of manufacture by the use of separate machines. After the hairpins are assembled with the armature core the parallel ends of the hairpins which project beyond one end of the core are bent radially toward the armature shaft so that the ends of the hairpins will be at a distance from the armature shaft approximately equal to the distance between the shaft and conductor receiving portions of a commutator to be assembled with the shaft. This operation of bringing the hairpin bar ends closer to the armature shaft is generally known as necking down. A machine for performing this operation is disclosed in G. W. Elsey Patent No. 1,703,188, patented February 26, 1929.

As each armature core slot receives the active coil sides of two different armature hairpins, the projecting ends or leads of all of these pins will be located in two circular rows concentric with the axis of the core. It is necessary to bend the leads of these hairpins circumferentially, the inner row of leads being bent in one direction and the outer row of leads in the opposite direction. This operation is generally known as twisting since each row of leads taken as a unit is twisted or circumferentially displaced about the armature shaft. A machine for twisting the inner and outer rows of hairpin leads is disclosed in G. W. Elsey Patent No. 1,690,336, patented November 6, 1928.

Following the operation of twisting the hairpin leads so that the ends of the leads have been angularly displaced a predetermined distance from the core slots containing the active coil sides with which those leads are connected, a commutator is press-fitted over the armature shaft. Before assembling with the armature shaft, the commutator had been not only longitudinally aligned with the armature shaft, but its hairpin lead receiving notches had been radially aligned with groups or pairs of hairpin leads. Apparatus for assembling a commutator upon an armature shaft is disclosed in Lora E. Poole Patent No. 1,670,984, patented May 22, 1928.

Following the assembling of the commutator upon the armature shaft, portions of the commutator known as risers are crimped around the ends of the leads of the hairpin conductor bars. A machine for crimping the commutator riser tangs around the armature bar ends is disclosed in the patent to R. H. Ahlers and E. M. Polk No. 1,556,892, patented October 13, 1925. The armature is then placed in a lathe which trims off the commutator and the end portions of the hairpin bars which protrude beyond the commutator risers.

It is an object of the present invention to provide a single machine which is fully automatic in operation and by which the various steps of necking down the hairpin conductor leads, the twisting of the leads, the assembling of the commutators with the armature shaft and with the leads and the crimping of the commutator riser tags around the leads are performed in succession. In the disclosed embodiment of the present invention this object is accomplished through the use of a rotary conveyor upon which a plurality of workholders are mounted, each workholder supporting an armature core with the hairpin conductors mounted thereon. The rotary conveyor moves intermittently to locate the workholders successively adjacent the various devices for performing the operations which have been referred to.

A further object of the present invention is to provide for assembling upon each armature assembly a strip of insulating material located between the inner row and the outer row of hairpin conductor lead ends. The apparatus for performing this operation is located between the necking apparatus and the twisting apparatus. This insulation applying apparatus itself comprises a plurality of workholders mounted upon a rotatable conveyor, each workholder supporting its insulating strip and carrying it from a loading position to the position in which the strip is to be assembled with the armature.

A further object of the invention is to provide for the conveyance of commutators to the apparatus from a loading station to the position where the commutator is assembled with the armature shaft. For this purpose there is provided a chain conveyor carrying a plurality of commutator holders movable from a loading position to a position in alignment with the armature shaft. Each commutator workholder therefore provides in turn a part of the apparatus for assembling the commutator with the shaft. The commutator conveyor is so located with respect to the rotary conveyor of workholders for carrying insulating strips that a single operator may load not only insulating strip workholders, but also the workholders for conveying commutators.

In the disclosed embodiment of the machine the armature workholder conveyor is rotated intermittently through a Geneva gear movement driven by an electric motor. Movement is transmitted from the armature workholder conveyor to the conveyors of insulating strips and commutators. The apparatuses of the machine which performs operations upon the hairpin conductor ends or which assembles parts therewith are performed by hydraulically operated devices. In this connection it is a further object of the invention to provide for the control of these hydraulically operated apparatuses in timed relation with respect to movements of the various workholder conveyors.

Further objects and advantages of the present invention will be apparent from the following description, reference being had to the accompanying drawings, wherein a preferred embodiment of the invention is clearly shown.

In the drawings:

Fig. 1 is a perspective view of a machine embodying the present invention.

Fig. 2 is a perspective view showing an armature received by the workholders at the loading station.

Fig. 3 is a perspective view showing the armature after the necking down operation.

Fig. 4 is a perspective view showing the armature after assembling an insulating strip between the inner row and the outer row of hairpin conductor leads.

Fig. 5 is a perspective view showing the armature after the lead twisting operation.

Fig. 6 shows the armature after assembling a commutator therewith.

Fig. 7 is a perspective view showing the armature after crimping the core riser bars around the ends of the hairpin leads.

Figure 9:
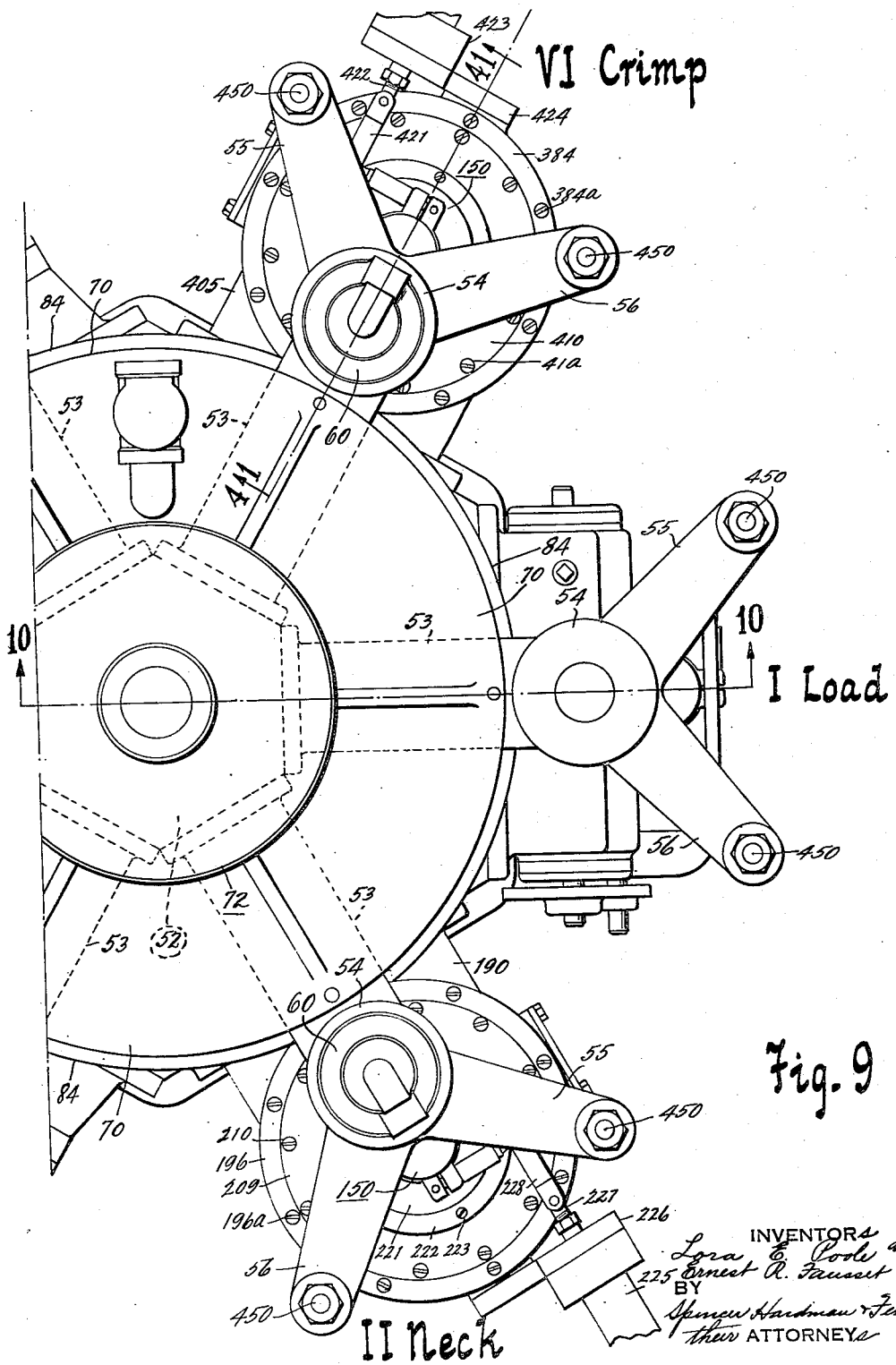

Figs. 8 and 9 taken together constitute a plan view of the machine.

Figure 10:
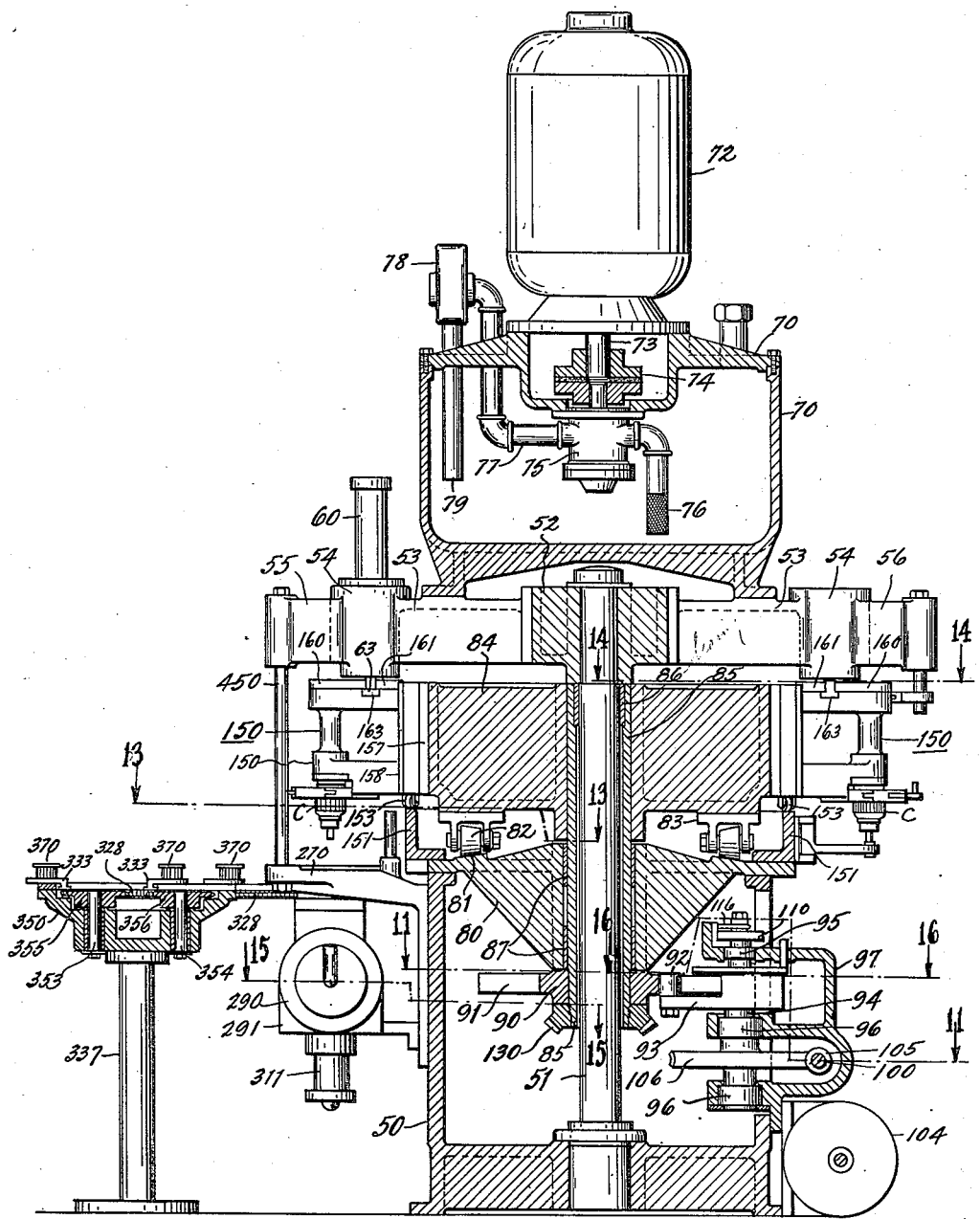

Fig. 10 is a longitudinal sectional view taken generally on the line 10—10 of Figs. 8 and 9.

Fig. 11 is a sectional view on an enlarged scale taken on the line 11—11 of Fig. 10.

Fig. 11a is a fragmentary sectional view on the line 11a—11a of Fig. 12.

Fig. 12 is a sectional view on the line 12—12 of Fig. 11.

Figs. 13, 14, 15 and 16 are sectional views on lines 13—13, 14—14, 15—15 and 16—16 respectively of Fig. 10 and are drawn to a larger scale than Fig. 10 and to the same scale as Figs. 8 and 9.

Figure 14:
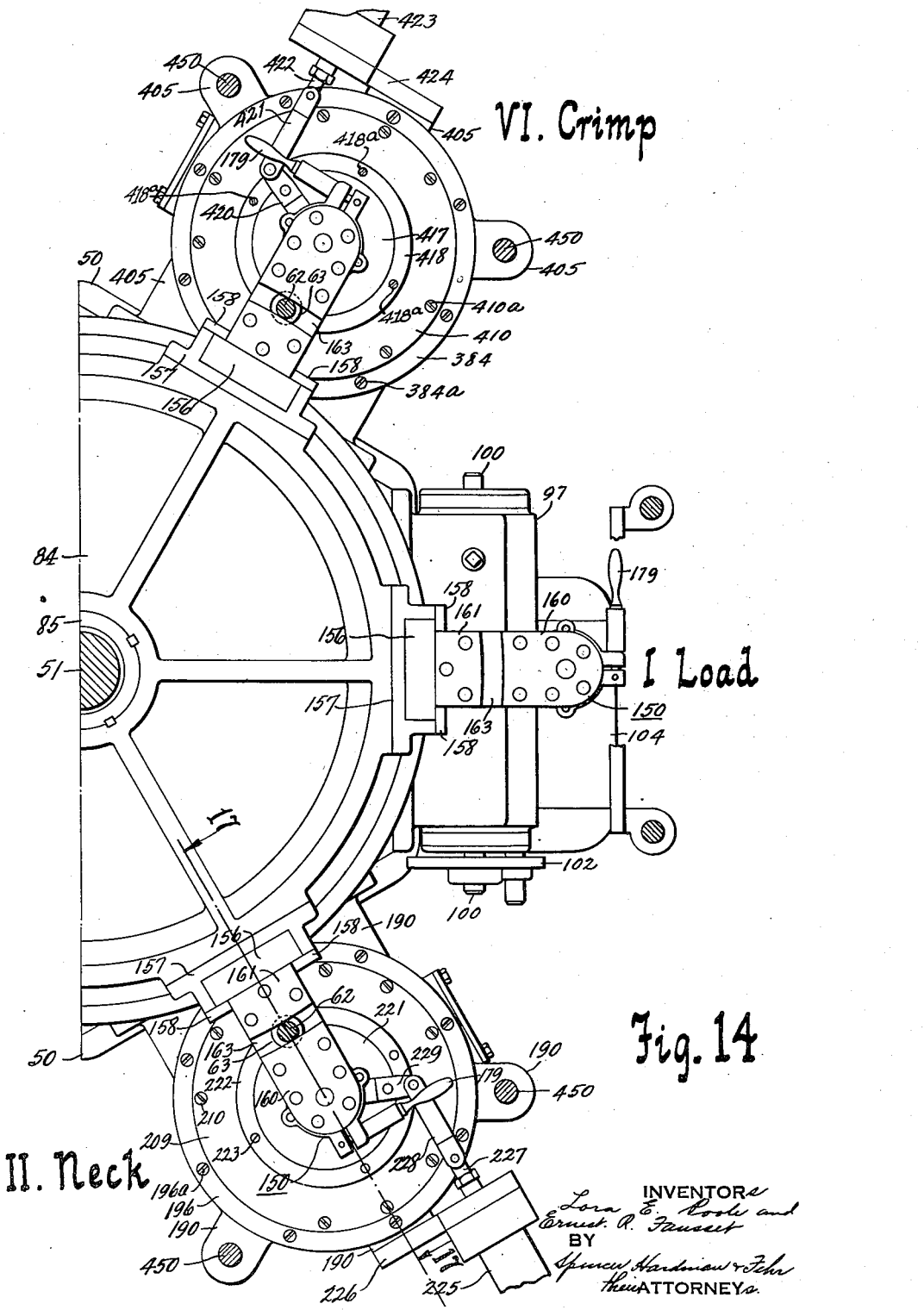
Figure 15:
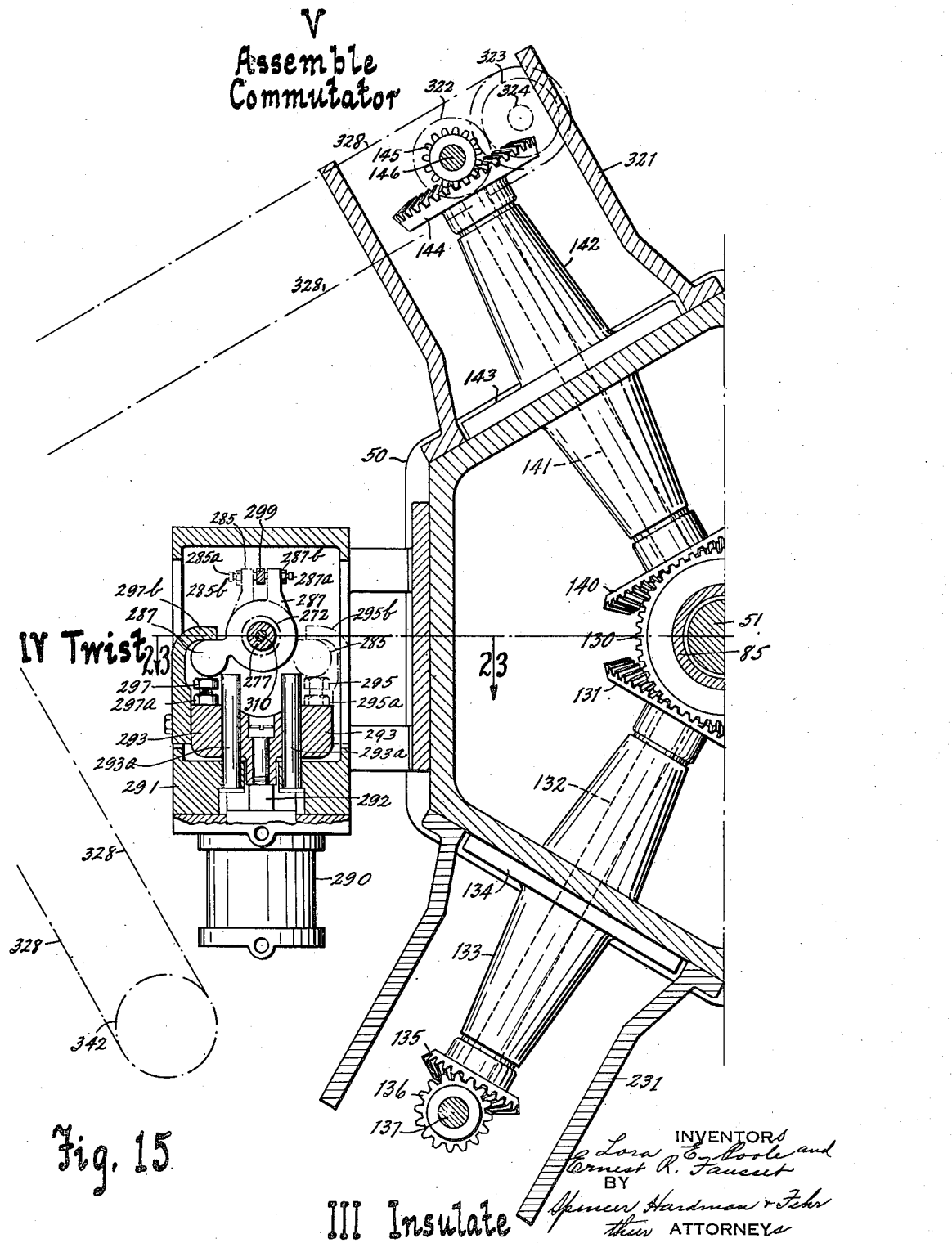
Figure 16:
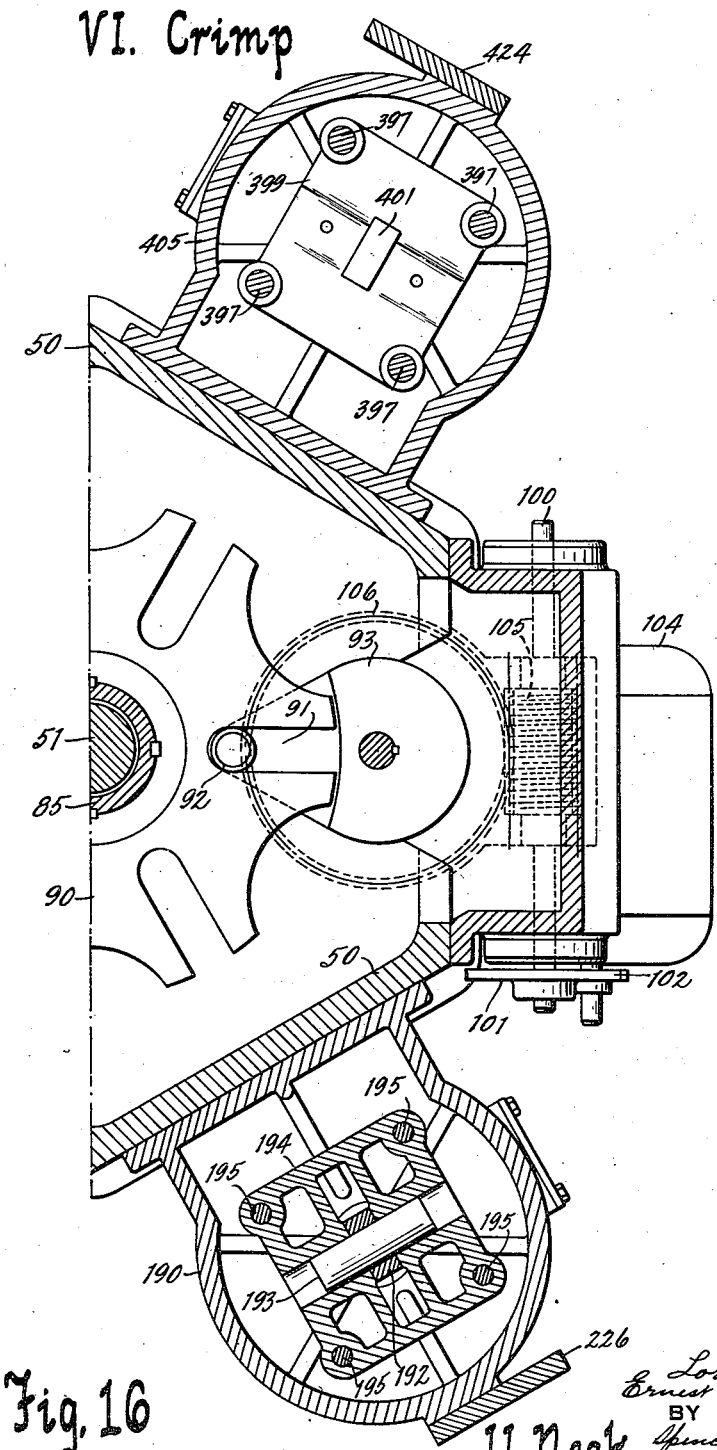
Figure 17:
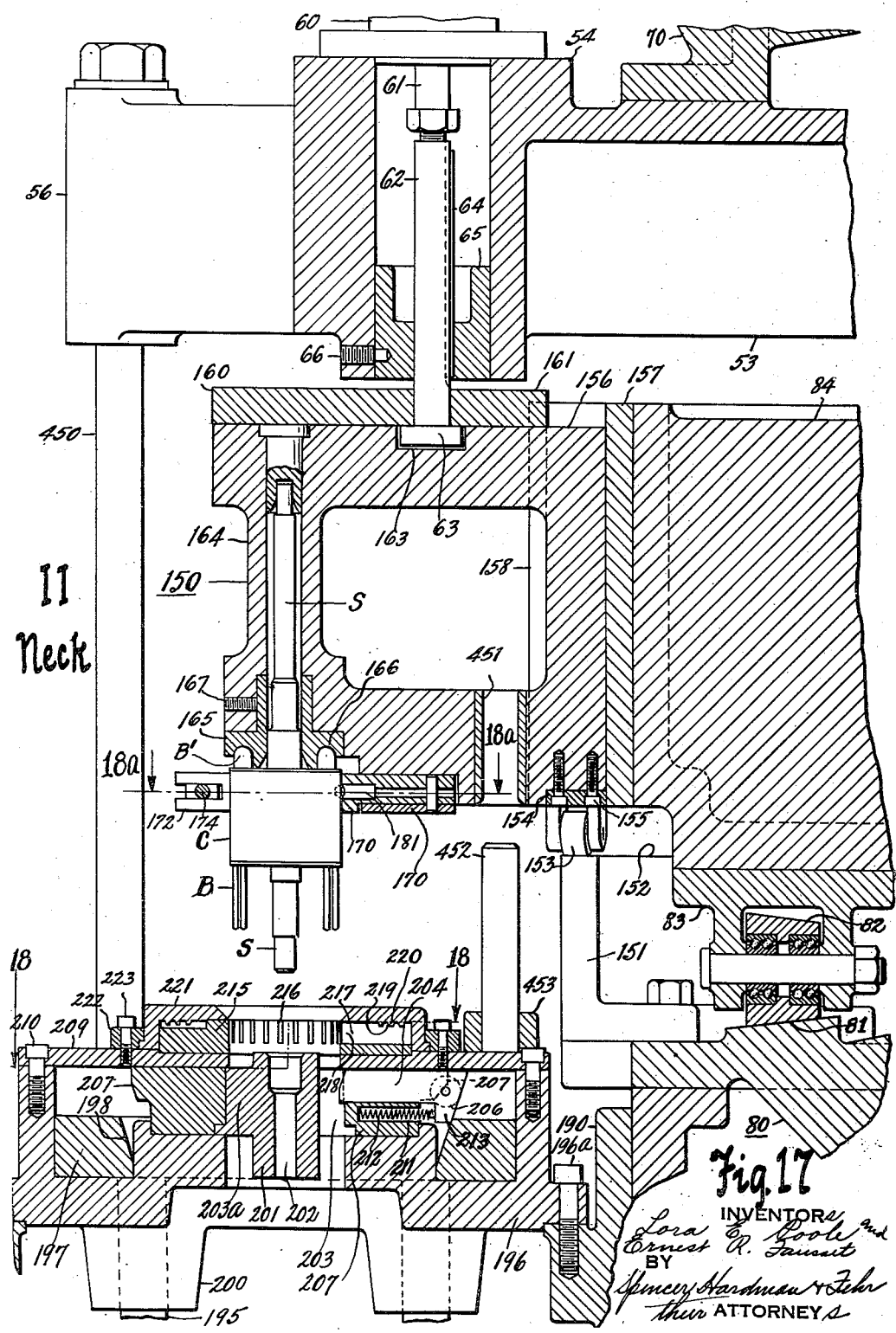

Fig. 17 is a sectional view on the line 17—17 of Fig. 14.

Figs. 18 and 18a are sectional views taken, respectively, on the lines 18—18 and 18a—18a of Fig. 17 and are drawn to a larger scale than Fig. 17.

Figure 13:
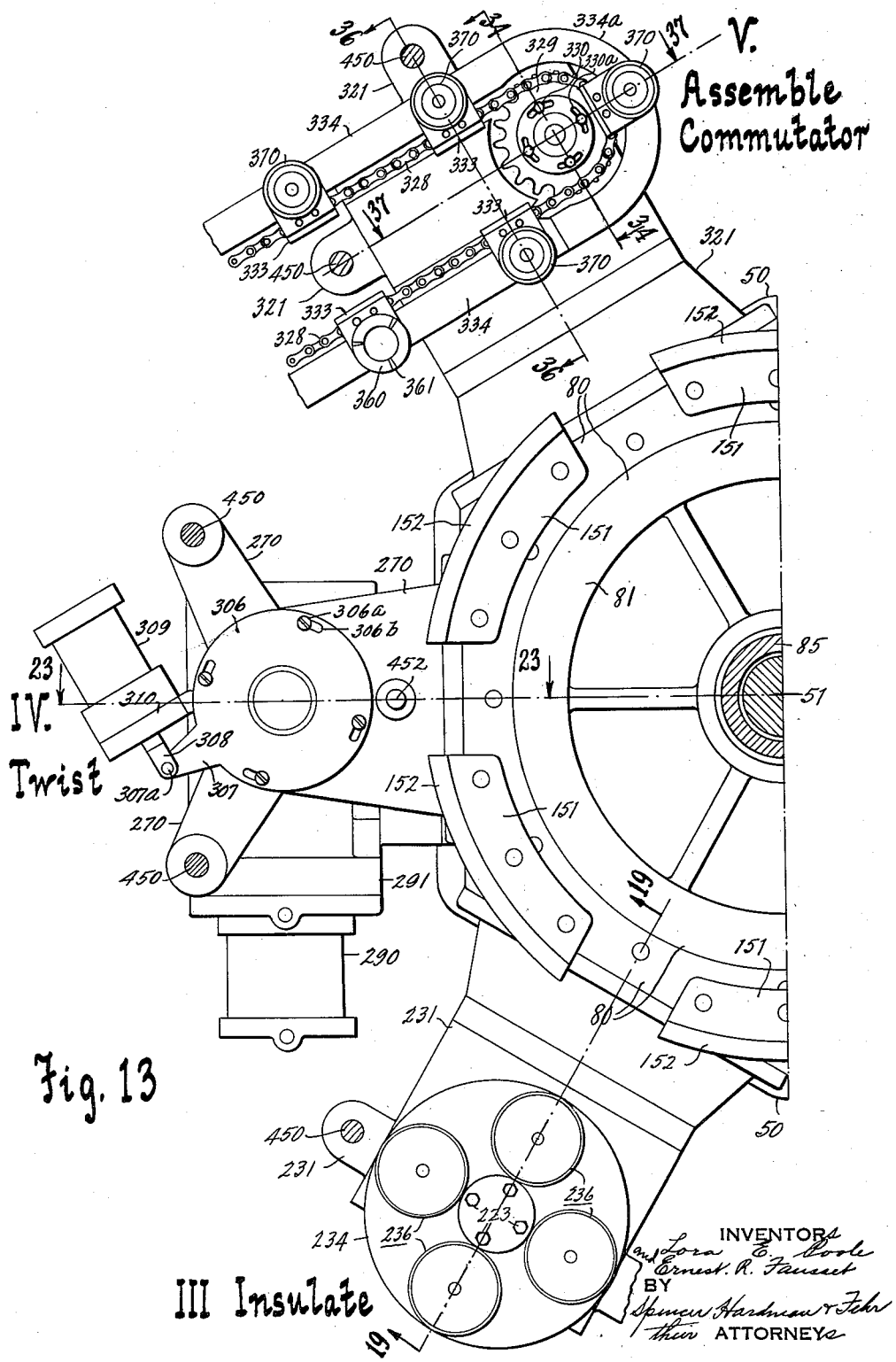
Figure 19:
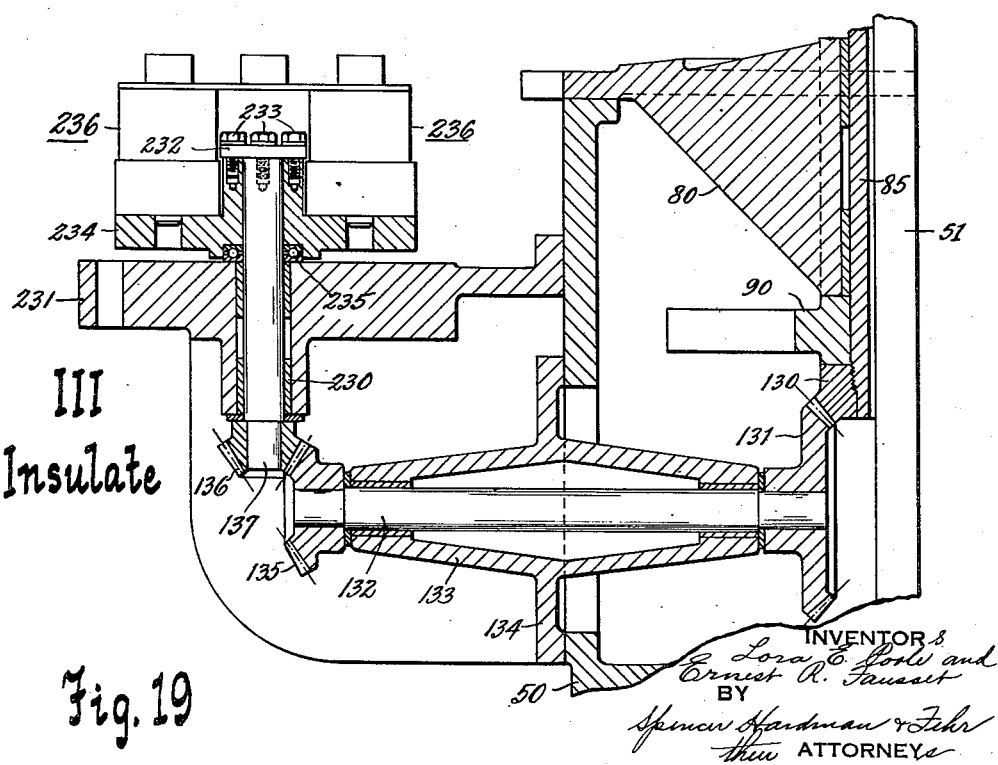

Fig. 19 is a sectional view on the line 19—19 of Fig. 13.

Figure 20:
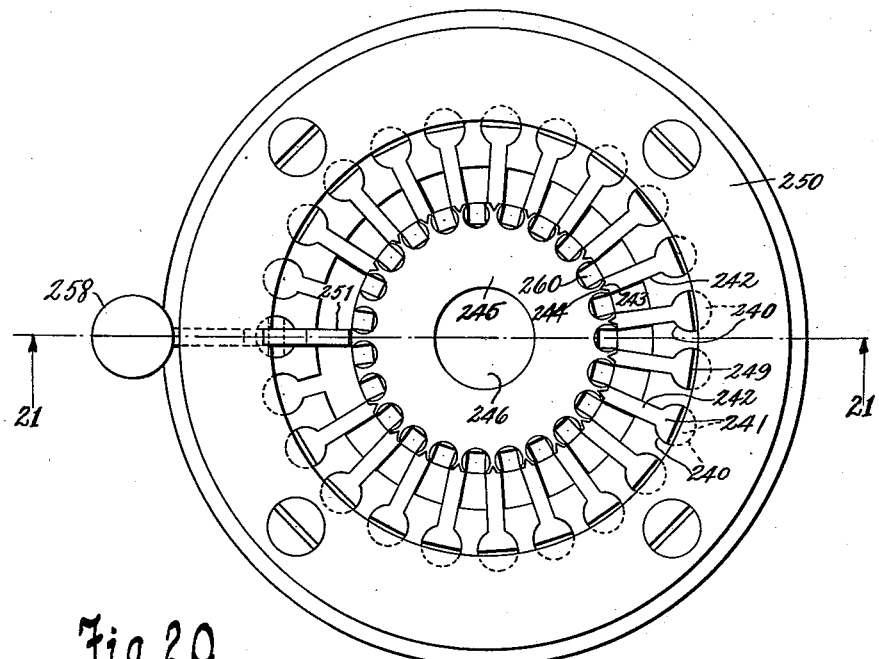

Fig. 20 is an enlarged plan view of one of the workholders for carrying an insulating strip.

Figures 21, 22:
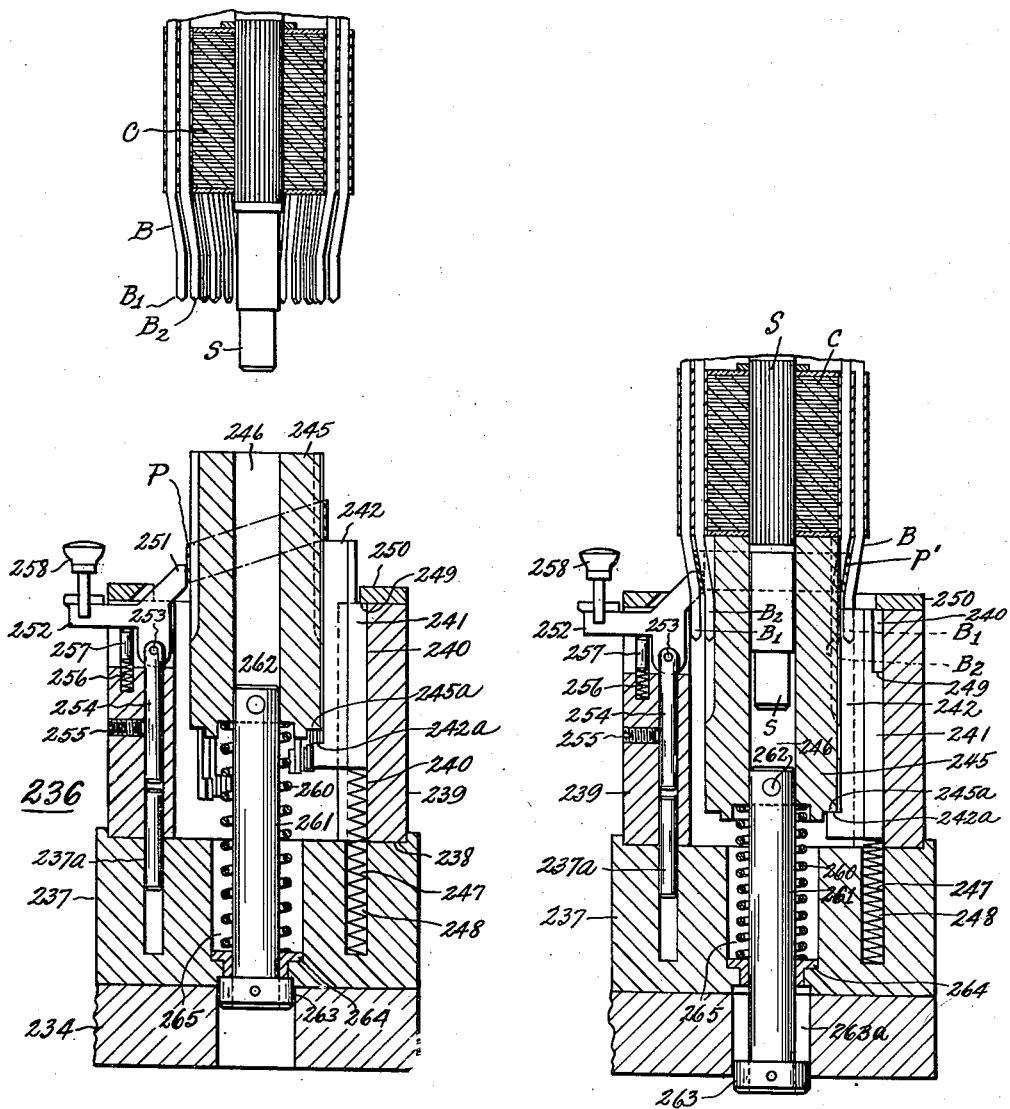

Fig. 21 is a sectional view on the line 21—21 of Fig. 20 and is drawn to a smaller scale than Fig. 20 and a larger scale than Fig. 19. Fig. 21 also shows a vertical sectional view of an armature located above the insulating strip workholder.

Fig. 22 is a view similar to Fig. 21 showing the armature received by the insulating strip workholders, the insulating strip having been transferred to the armature.

Fig. 23 is a sectional view on the line 23—23 of Fig. 13.

Fig. 24 is a fragmentary view of a part of Fig. 23 showing the result of the twisting operation.

Fig. 25 is a sectional view on the line 25—25 of Fig. 23.

Fig. 26 is a sectional view on the line 26—26 of Fig. 23.

Fig. 27 is a fragmentary side view in the direction of the arrow 27 of Fig. 23.

Fig. 28 is a sectional view on the line 28—28 of Fig. 27.

Figs. 29 and 30 are diagrams showing the operation of the twisting mechanism of Fig. 23.

Fig. 31 is a fragmentary view of the twisting mechanism.

Figs. 32 and 33 are fragmentary enlargements of portions of Fig. 31 to show the operation of the mechanism.

Fig. 34 is a fragmentary view on the line 34—34 of Fig. 33 and Fig. 8.

Fig. 35 is a fragmentary view on the line 35—35 of Fig. 34.

Fig. 36 is a sectional view on the line 36—36 of Fig. 13 and Fig. 8.

Fig. 37 is a sectional view on the line 37—37 of Fig. 13.

Fig. 38 is a sectional view on the line 38—38 of Fig. 8.

Fig. 39 is a sectional view on the line 39—39 of Fig. 8.

Fig. 40 is a sectional view on the line 40—40 of Fig. 8.

Fig. 41 is a sectional view on the line 41—41 of Fig. 9, and is drawn to a larger scale.

Figure 42:
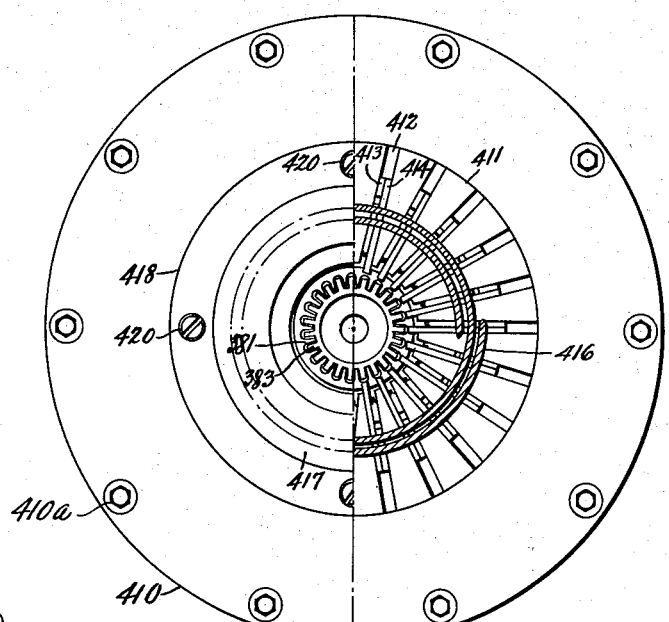
Figure 43:
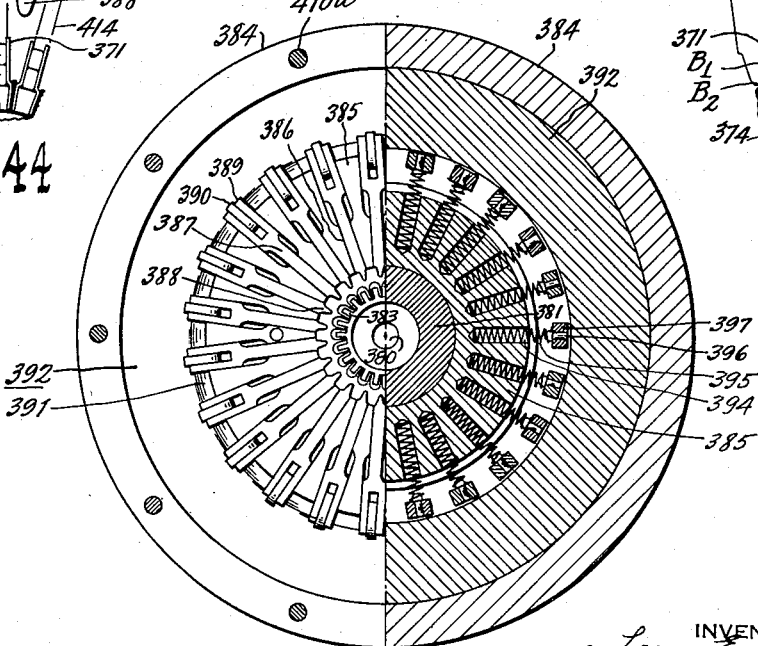

Figs. 42 and 43 are sectional views taken respectively on the lines 42—42 and 43—43 of Fig. 41.

Figure 44:
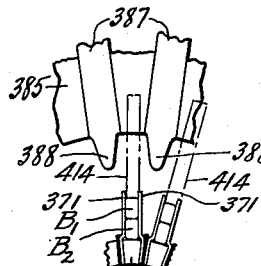
Figure 45:
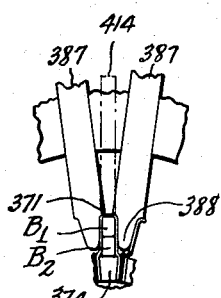

Figs. 44 and 45 are diagrams showing the operation of the crimping mechanism of Figs. 41, 42 and 43.

Figure 46:
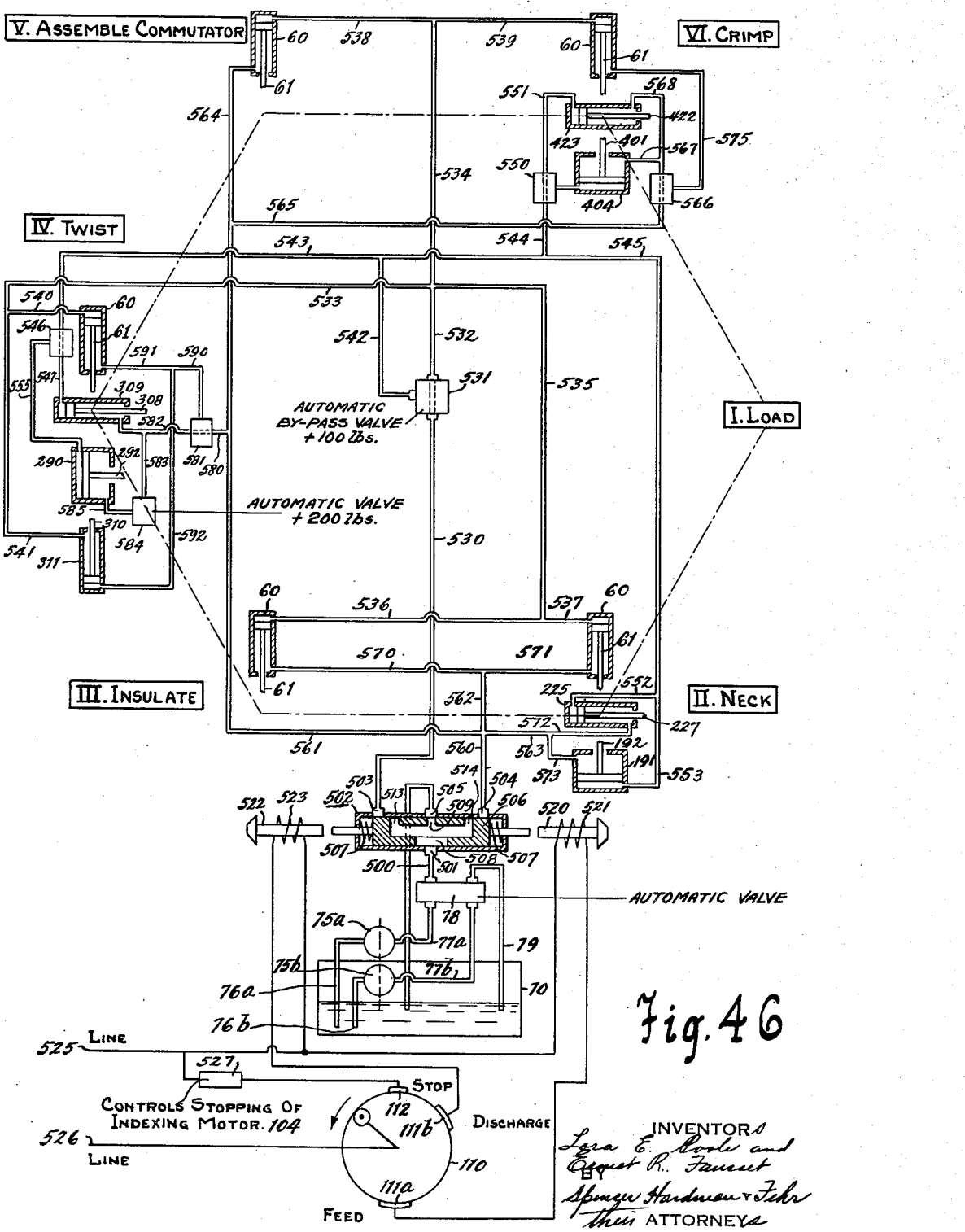

Fig. 46 is a diagram of the control of the various fluid pressure devices which actuate the mechanism for performing operations upon the hairpin conductors or for assembling parts thereof.

ARMATURE CONVEYOR

Referring to Figs. 1 and 10, the machine comprises a base 50 of hexagonal formation, as shown in Figs. 13 and 14. The base 50 supports centrally thereof a stationary rod or post 51 the upper end of which supports a hexagonal block 52. Upon each of the six flat sides of the block 52 is mounted an arm 53 integral with a hollow cylindrical boss 54. From each boss 54 there extends two branch arms 55 and 56. All of these arms 53 are alike with the exception of the upper one marked 53a in Fig. 8. This arm differs from the other with respect to the location of the branch arm 56a which in this case extends from the block or hub 52 radially and in alignment with the arm 53a. Each tubular boss 54 of each arm except one supports a fluid pressure cylinder 60 from which a piston rod 61 extends downwardly through the boss 54 and is threadedly connected with a rod 62 provided at its lower head with a square head 63. The rod 62 is splinedly connected by key 64 with a bushing 65 mounted within boss 54 and secured by set screw 66.

The pressure fluid for operating the pistons within the cylinder 60 is supplied from a reservoir or tank 70 mounted upon the arms 53. The tank cover 71 supports an electrical motor 72 having a shaft 73 connected by coupling 74 with a pump 75. The pump 75 has a strainer inlet 76 and outlet pipe 77 connected with a valve 78 having a low pressure pipe 79 returning to the reservoir 70.

The base 50 supports a frame 80 which serves as a cover for the base 50 and which provides a track 81 for supporting rollers 82 pivoted on trunnion blocks 83 attached to the lower side of a wheel or drum 84 which is keyed to a tubular shaft 85 having bearings 86 journaled on the rod 51 and journaled within bearings 87 provided by frame 80. To the lower end of the shaft 85 there is attached a driven disc 90 of a Geneva gear movement, said disc 90 being slotted at 91 to receive a roller 92 on a Geneva driving arm 93 which is fixed to a shaft 94 journaled in bearings 95 and 96 mounted in a frame 97 attached to the base 50. The frame 97 (Fig. 11) provides bearings 98 and 99 for a shaft 100 carrying a pulley 101 driven by a belt 102 connected with a pulley 103 driven by an electric motor 104 secured to the frame 97 and the base 50. Shaft 100 drives a worm 105 which drives a worm wheel 106 which drives the shaft 94. Thus the wheel or drum 84 is intermittently rotated through the operation of a Geneva gear drive driven by the electric motor 104. The drum 84 carries armature supporting work holders to be described. While drum 84 is stationary certain operations are performed upon armatures supported by these work holders. These operations are performed by hydraulically actuated mechanism the control of which is initiated by an electromagnetic means in turn controlled by a rotary switch driven by the shaft 94. This switch comprises a non-conducting ring 110 having metallic inserts 111a, 111b and 112 connected with terminals 113a, 113b and 114 respectively. Terminals 113b and 114 are adjustable in groove 110a of ring 110. The common terminal is provided by screws 115 by which a leaf spring conductor 116 is attached to a non-conducting support provided by a bar 117. The bar 117 is attached to a bracket 118 provided by frame 97 and bar 117 provides a support for a plate 119 by which the ring 110 is supported. The spring 116 bears against the upper portion of a metal ring 120 which is driven by the shaft 94 but is insulated therefrom by an insulating bushing 121. The ring 120 carries an arm 122 pivotally supporting a lever 123 which pivotally supports a roller 124 which, during rotation of ring 120, moves into and out of contact with the inserts 111 and 112 to complete an electric circuit through these inserts at the proper times. A spring 125 connected with arm 123 and with ring 120 causes the roller 124 to follow the track provided by the ring 110 and to yieldingly press against the inserts 111a, 111b and 112.

A nut 126 threadedly engaging the upper end of shaft 94 forces an insulating washer 127 against the ring 120 and causes the bushing 121 to be forced against a washer 128 resting upon a shoulder 94a of shaft 94, said washer being driven by the shaft 94. Thus the sleeve 120 is driven by shaft 94 but is insulated therefrom.

The sleeve 85 drives a bevel gear 130 (Fig. 15) fixed to its lower end. Gear 130 drives a gear 131 mounted on a horizontal shaft 132 supported by frame 133 including a mounting pad 134 secured to the frame 50. Shaft 132 drives a bevel gear 135 meshing with a bevel gear 136 which drives a vertical shaft 137 connected with an insulating strip conveyor to be described later. Gear 130 drives the bevel gear 140 carried by shaft 141 journaled in a bracket 142 which includes a pad 143 attached to frame 50. Shaft 141 drives a bevel gear 144 meshing with a gear 145 driving a vertical shaft 146 for operating a commutator conveyor to be described.

Armature Work Holder

The drum 84 supports six armature work holders 150 which are mounted for vertical movement with respect to the drum. The plate 80 supports an interrupted track comprising five arcuate brackets 151 (four are shown in Fig. 13), each presenting an arcuate track 152 (Fig. 17) for supporting rollers 153, there being one roller for each of the work holders 150. Each roller 153 is mounted in a bracket 154 attached by screws 155 to a frame 156 which is guided for vertical movement by a channel plate 157 to which bars 158 are attached so that the frame 156 will be retained for vertical sliding movement.

Upon the upper surface of frame 156 there are mounted plates 160 and 161 which are spaced apart so that the rod 62 may be received by the space between plates 160 and 161 as the work holders are rotated by the drum 84. The plates 160 and 161 overlie an arcuate groove 163 provided by the frame 156, the center of the curvature of the groove 163 being the center of the rod 51 (Fig. 10). The head 63 of rod 62 is received by the groove 163 at the time the rod 62 passes between the plates 160 and 161. With the exception of the work holder 150 at the loading station, at the end of each intermittent movement of drum 84, the work holders 150 will be located in alignment with mechanisms for performing operations upon armature assembly. When the work holders 150 are located the rod 62 will be located relative to the work holders, as shown in Fig. 14, and the rollers 153 will be located midway between the ends of brackets 151. Therefore, the work holders 156 will not be supported by the brackets 152 but will be supported by the rods 62. This applies to all of the work holders in any of the five armature operating positions but it does not apply to a work holder when in the loading position, as will be explained later. In other words, when any one of the work holders 150 is located, as shown in Fig. 17, in alignment with apparatus for performing an operation upon an armature, the work holder frame 156 is permitted to move vertically and is so moved through the operation by hydraulic means associated with a rod 62 which then supports the frame 156. But, when the drum 84 is moving the work holders between operating stages, each frame 156 will be disengaged from the rod 62 but will be prevented from descending because each frame is supported by track segment 151 having a track surface 152 engaged by roller 153 supporting a frame 156.

Each work holder frame 156 includes a tubular sleeve 164 for receiving an armature shaft S carrying a core C supporting bar or hairpin windings B. The upper end portions or yoke portions of the windings B indicated at B' are received by the annular groove 166 of a block 165 secured to the frame 156 by set screw 167. Frame 156 supports an armature core clamp comprising a relatively fixed holder 170 providing an arcuated semi-cylindrical surface 171 for engaging the armature core C. Holder 170 pivotally supports arc-shaped arms 172 and 173. Arm 172 pivotally supports a rod 174 which may be received by a notch 175 between lugs 176 on arm 173. Rod 174 passes through a sleeve 177 having a slot 177a for receiving an end of a pin 178 fixed to a handle 179 secured to rod 174. A spring 180 is confined between pin 178 and an end of the sleeve 177 and urges the sleeve forcibly against the lugs 176 of arm 173, thus clamping the core C firmly against the holder 170. When the handle 179 is pulled toward the operator, arm 173 will be released from connection with the arm 172 so that the armature C may be removed from the work holder. When an armature is mounted upon a work holder with a shaft S within the tubular sleeve 164 its core C will be properly located when a locating dog 181 supported by holder 170 enters a tooth space of the core. After a core has thus been located as determined by the dog 181 the clamping members 172 and 173 are moved against the core C then the handle 180 is moved away from the operator thereby causing the sleeve 177 to engage the lugs 176 of member 173 thereby causing the lugs 176 to cam the sleeve 177 toward the right (Fig. 18—A), in order to compress spring 180 beyond its initial state of compression in order that the core C will be firmly clamped by the work holder clamping members 170, 172 and 173.

Referring to Figs. 8, 9, 13 and 14 the armature assembly is mounted upon a work holder 150 at the loading station "I. Load" (shown in Figs. 1, 9 and 14). The drum or wheel 84 rotates clockwise by intermittent motion in order to carry the work holders successively to the hairpin necking station, "II. Neck" (Figs. 9 and 14) to the insulator strip applying station "III. Insulate" (Figs. 8 and 13), to the twisting station "IV. Twist" (Figs. 8 and 13) to the commutator assembling station "V. Assemble commutator" (Figs. 8 and 13) and to the crimping station, "VI. Crimp" (Figs. 9 and 14) where the commutator riser bars are crimped around the armature conductor lead. Finally the armature assembly returns to the station "I. Load" where it is removed from its work holder and is replaced by an armature assembly to be operated upon by the machine.

Fig. 2 shows an armature assembly at the loading station I. Fig. 3, shows the armature at the crimping station II. Fig. 4 shows the armature at the insulating station III, where an insulating strip is assembled with the armature. Fig. 5 shows the twisting station IV where the armature leads are twisted into proper radial alignment with notches provided by the commutator to be assembled in the next station. Fig. 6 shows the commutator assembling station V. Fig. 7 shows the crimping station VI where the riser bars of the commutator are crimped around the armature conductor leads.

STATION II

*Armature conductor necking apparatus*

The armature conductor necking apparatus performs the operation of bending the armature conductor leads inwardly toward the armature shaft from the position shown in Fig. 2 to that shown in Fig. 3. Fig. 3 shows the Station II where the necking operation is performed.

Referring to Figs. 3, 9, 14, 16, 17, 18, a frame 190 secured to base 50 supports a hydraulic cylinder 191, Fig. 1. Cylinder 191 receives a piston, not shown, connected by a rod 192, Fig. 16, and a pin 193 with a plate 194 connected with 4 rods 195. The frame 190 supports a cover plate 196 (Fig. 17) providing an annular channel which receives a cam ring 197 provided with a cam surface 198. The ring 197 is attached by screws 199 (Fig. 18) to the rods 195 which are guided for vertical movement by apertured bosses 200 integral with the plate 196. Plate 196 supports centrally thereof a block 201 having a central bore 202 for receiving the lower end of the armature shaft S. The block 202 is provided with radial grooves 203 for receiving the ends of radially sliding bars 204. Each bar 204 is integral with a bifurcated portion 205 pivotally supporting a roller 206. These bifurcated portions 205 are guided by the walls of a channel 205a provided by a block 207 supported by the frame 196 and secured thereto in proper relation by a dowel pin 208. A plate 209 secured to frame 196 by screws 210 retains the blocks 201 and 207 upon the frame and the slides 204 within the grooves provided by blocks 201 and 207. Block 207 provides radially extending recess 211 each receiving a spring 212 engaging a lug 213 of each slide 204. Each spring 212 therefore urges the slide 204 radially outwardly so that it will engage the camming surface 198 of ring 197.

Plate 209 supports annular plate 215 providing radial grooves 216 for guiding radially slidable bars 217 each provided with a finger 218 at its inner end, said finger being adapted to extend in to an armature core slot and engage the outer active coil side therein in order to maintain both coil sides in the slots while the leads thereof are being bent radially inwardly or necked down as shown in Fig. 3. Each bar 217 is provided with a rack portion 219 for engaging a spiral worm 220 integral with a plate 221 rotatably supported by plate 209 and rotatably guided thereon by ring 222 secured to plate 209 by screws 223.

The plate 221 is rotated by fluid pressure means comprising a cylinder 225 (Fig. 14) mounted on a bracket 226 attached to frame 190 and cooperating with a piston, not shown, connected by a piston rod 227 and a link 228 with an arm 229 attached to the plate 221. When the piston rod 227 moves upwardly as shown in Fig. 14 the plate 221 will be rotated counterclockwise. The spiral worm 220 integral with plate 221 rotates counterclockwise as shown in Fig. 18 to cause the bars 217 to move in.

The operation of the necking down apparatus is as follows: After the drum 84 has been rotated to move the armature shaft S in alignment with the recess in the block 202, the pressure fluid is admitted into that cylinder 60 with which the rod 61 is associated. The rod 61 descends thereby moving work holder 150 downwardly thereby causing the shaft S to move down into the bore 202 of block 201 and the core C to move downwardly until it reaches the upper end of block 201. During this movement, the grooves 203 of block 201 receive the lower ends of armature conductors B. Following this operation pressure fluid is admitted to the cylinder 225 to cause the rod 227 to move upwardly (Fig. 14) and to effect counterclockwise rotation of plate 221 (Fig. 18) and the inward movement of bars 217 so that each finger 218 will be pressed against a bar B in a core slot. Following this operation a pressure fluid is admitted to the lower end of cylinder 191 (Fig. 1) thereby causing the rods 195 to move upwardly and to force the camming ring 197, against the rollers 206 thereby causing the bars 204 to move inwardly to engage the bars B of the armature assembly and force their extreme ends into contact with the hub of the block 201 thereby causing the bars B to be bent into the shape shown in Fig. 3.

After this necking operation is performed pressure fluid is admitted to the upper end of cylinder 225 (Fig. 14) to cause the plate 221 (Fig. 18) to rotate clockwise to cause base 226 to move outwardly. Then pressure fluid is admitted into the upper end of cylinder 191 to cause the ring 197 to move to its normal position thereby releasing the springs 212 which cause the bars 204 to return to normal position. Then pressure fluid is admitted to the lower end of the cylinder 60, Fig. 17, in order that the piston rod 61 moves upwardly and to move the work holder 150 to normal position (Fig. 3) thereby retracting the armature assembly from the necking apparatus.

STATION III

Armature insulating apparatus

Referring to Figs. 19 to 22, the shaft 137 (Fig. 19) is journalled in bearings 230 mounted in a frame 231 supported by a base 50. Shaft 137 is integral with a disc 232 connected by screws 233 with the plate 234 supported by a step ball bearing 235 by the frame 231. The plate 234 provides a rotary conveyor for four workholders 236, which will be described with reference to Figs. 21 and 22.

Each workholder 236 comprises a block 237 fixed to the plate 234. Block 237 is counterbored at 238 to receive a block 239. The block 239 is provided with a circular row of cylindrical bores 240 each receiving a cylindrical portion 241 of a vertically slidable bar 242. Each bar 242 is provided with a V-edge 243 received by a V-groove 244 in a central block 245 having a central bore 246 for receiving the end of the armature shaft S. The bars 242 are urged upwardly by springs 247 confined by recesses 248 in block 237. Bars 242 therefore are urged upwardly until shoulders 249 thereof engage an annular plate 250 mounted upon the block 239. The shoulders 249 of the different bars 242 are not located all at the same distance from the tops of these bars. The variation in the distances from the tops of the bars to the shoulders 249 thereof is such that, when the bars 242 are in upper position, these bars will be positioned somewhat like the steps of two spiral stair cases which lead upwardly from both sides around the core block 245, as shown in Fig. 4. A strip of insulating paper P is placed (after the fashion of a collar) around the central block 245, the bottom edge of this collar strip resting upon the tops of the bars 242. The overlapping portions of the strip P are held resiliently in position by a finger 251 provided by lever 252 pivoted at 253 on a rod 254 fixed to the block 239 by set screw 255. The finger 251 is urged against the finger strip P by a spring 256 urging upwardly a pin 257 which engages the lever 252. The finger 251 can be retracted from the block 245 by pressing down a finger piece 258 in order to facilitate placing the overlapping ends of the paper strip P between the finger 251 and the block 245 before releasing the lever.

The block 245 is provided with horizontally extending grooves 260 each adapted to receive a lead of an inner active coil side as shown in Fig. 22. The leads from the outer active coil sides are received in the space between the inner block 245 and the outer block 239 and between the bars 242. Block 245 is resiliently supported in its upper position by a spring 260 encircling a rod 261 pinned at 262 to the block 245 and pinned at its lower end to a collar 263 adapted to be received in a recess 263a of the block 234 and slidable through a bushing 264 located at the bottom of a recess 265 in block 237. The spring 260 is confined in a normal state of compression as shown in Fig. 21 between the block 245 and the bushing 264.

The operation of the insulating strip of my mechanism will now be described. Referring to Fig. 4 showing the four strip workholders 236 in different positions, it will be noticed that one of the workholders is nearest to the bottom of the drawing. This workholder is in the loading position, and it will be seen that a strip P has been placed thereon. During each 60° of rotation of the armature work carrier drum 84, the work carrier 236 will be rotated bodily 90°. Therefore a strip P placed upon the workholder 236 nearest the operation will, after two indexes of drum 84, be located in alignment with the armature assembly. All of the armature workholders 150 descend at the same time. Therefore while workholder 150 of Fig. 3 is descending, the workholder 150 of Fig. 4 descends from the position shown in Figs. 3 and 21 to the position shown in Fig. 22. During the descent of this workholder 150, the shaft S enters the bore 246 of block 245, and the core C engages the upper end of block 245 and moves it from the position shown in Fig. 21 to that shown in Fig. 22. During the downward movement of block 245, the bars 242 are caused to move downwardly from the position shown in Fig. 21 to that shown in Fig. 22 due to the fact that the bottom edge 245a of block 245 engages lugs 242a of the bars 242, thereby carrying the bars downwardly into the position shown in Fig. 22. As the ends of the armature conductor bars B move downwardly, there is relative motion between the strip P and these bar ends and the strip P is located in the annular spaces between the two concentric rows of bar ends. The strip P instead of being arranged helically about the block 245 as shown in Fig. 21, is caused to take the position shown at P' in Fig. 22. Therefore, during upward movement of the workholders 150 to carry the armature assembly upwardly, the strip P remains assembled with the armature bar ends due to the fact that the force which would be required to pull the strip P from the bar ends, when in the position shown in Fig. 22, is much greater than the frictional force exerted by the spring pressed finger 251. Consequently, when the armature returns to the postion shown in Fig. 4, the strip P is carried upwardly with it.

STATION IV

Armature conductor lead twisting apparatus

The apparatus, which twists the conductor leads B, as shown in Fig. 5, or circumferentially displaces them with respect to the core slots will now be described with reference to Figs. 5 and 23 through 35.

When an armature work-holder 150 is located in the position shown in Figs. 5 and 23, the shaft S will be located in alignment with the mechanism for circumferentially displacing or twisting the armature conductor bar B in the manner shown in Fig. 5. This apparatus comprises a frame 270 attached to base 50 and supporting a bearing sleeve 271 axially aligned with the armature assembly. Sleeve 271 provides a journal for tubular shaft 272, the upper end of which is keyed at 273 to a ring 274 provided with an annular row of notches 275 respectively, for receiving the lower ends of the outer row of conductor leads $B_1$ extending from the outer active coil sides. The upper end of shaft 272 engages a shoulder 276 provided by the head of a tubular shaft 277. This shafthead is provided with an annular row of notches 278, each for receiving a bar lead $B_2$ from an inner active coil side. Normally, the notches 275 and 278 are in radial alignment with each other as shown in Fig. 25 and these pairs of notches are in longitudinal alignment with the pairs of conductor leads $B_1$ and $B_2$ which are arranged in concentric annular rows. By mechanisms to be described, the shafts 272 and 277 are rotated in opposite directions the same angular distance; and, during this rotation, both sleeves are elevated so that the conductor bar ends $B_1$ and $B_2$ will still remain in the slots 275 and 278 although the distance from these bar ends to the lower face of the armature core is decreasing while the twisting of the leads is taking place. In order that the shafts 272 and 277 will be elevated together so they will be rotated in opposite directions, the shaft 277 is provided with a spiral slot 280 for receiving a pin 281 which extends through a hole in bearing sleeve 271. Pin 281 is provided by a screw 282 fastened to frame 270.

The shaft 272 is keyed at 284 to a lever 285 and shaft 277 is keyed at 286 to a lever 287. A nut 288 threaded on the lower end of shaft 277 retains the lever 287 against a shoulder 287a on shaft 277 and the lever 285 against a shoulder 285a on the shaft 272. These arms or levers 285 and 287 are rotated simultaneously in opposite directions by a fluid pressure operated mechanism comprising a cylinder 290, (Fig. 15) mounted on the side of a bracket 291 secured to base 50. Cylinder 290 cooperates with a piston, not shown, connected by a rod 292 with a head 293 which carries adjustable screws 295 and 297 engageable respectively with the levers 285 and 287. The relation between the heads of the screws 295 and 297 and the levers 285 and 287 is adjusted by turning these screws, and the screws are locked in adjusted position by lock nuts 295a and 297a respectively. The upward movement of the piston rod 292 in Fig. 15 (downward in Fig. 28) or horizontal movement in a direction toward the observer in Fig. 23, will cause lever 285 to be rotated counterclockwise in Fig. 15 and lever 287 to be rotated clockwise in Fig. 15. Consequently grooved collar 274 and its circular row of notches 275 will be rotated counter-clockwise in Fig. 25, and the circular row of notches 278 of shaft 277 will rotate clockwise. In order to displace the armature bar leads B from the positions shown in Fig. 4 to the positions shown in Fig. 5, the outer row $B_1$ is twisted counter-clockwise as viewed from above and the inner row $B_2$ is twisted clockwise as viewed from above in Fig. 5. These bar ends are twisted the same distance in order that, when attached to certain commutator bars of a commutator to be assembled later, the commutator bars will be located a specific angular distance away from the active coil sides with which they are connected. As stated before, during rotation of the parts 274 and 277 to effect this circumferential displacement of conductor bar ends with respect to their active coil sides, the twisting mechanisms are elevated, due to the cooperation of the pin 281 (Fig. 23) with helical slot 280 (Fig. 26), to take care of the decreasing distance between the conductor bar ends and the armature core.

The head 293 (Figs. 15 and 28) carries bars 295b and 297b engageable, respectively, with the levers 285 and 287. The spacing between the bar ends 295b and the heads of the screws 295 and 297 is slightly greater than the width of the levers 285 and 287 received between the bars and screws so that there is a slight amount of lost motion between the piston rod head 293 and the levers 285 and 287. When the piston rod 292 moves downwardly (Fig. 15), the levers 285 and 287 will be engaged, respectively, by the bars 295b and 297b, which cause the levers 285 and 287 to be rotated respectively in clockwise and counterclockwise directions, thereby returning them to the position shown in Fig. 15. In order that the notched members 274 and 277 will be returned to such position that their slots will be in radial alignment with each other and in proper longitudinal alignment with the bar ends of an armature assembly to be operated upon, the levers 285 and 287 are provided, respectively, with stop screws 285a and 287a for engaging a stationary stop member 299. The screws 285a and 287a are locked in the proper adjusted position by lock nuts 285b and 287b. Fig. 29 shows diagrammatically the normal relation of the slots 275 and 278. In one pair of these slots are initially located bar ends $B_1$ and $B_2$. After the members 274 and 277 have rotated respectively in counterclockwise and clockwise directions, this pair of bar ends will have been displaced to the extent indicated in Fig. 30. Since each bar end has been displaced an angular distance amounting to 2½ slot spaces, the total displacement is five slot spaces. Therefore, the bar ends from any pair of active coil sides in a single slot will be connected later on to commutator bars which are spaced apart an equivalent angular distance.

The displacement of the bar ends $B_1$ and $B_2$ circumferentially is shown in Fig. 35. During this displacement of the bar ends the bar portions immediately adjacent the armature core C will bend relative to the active coil side portions received by the core. In order that the bending of the leads relative to the active coil sides will not be too abrupt, so that the insulating disc $C_1$ at the outside end of the stack of laminations will not be distorted or so that the enamel on the conductors B will be destroyed, means are provided to limit the abruptness of the bend at this point. This means comprises a plurality of fingers 300 which are caused to move radially into the spaces between the bars B and directly over the insulating laminations $C_1$. The fingers 300 are provided at the ends of the slides 301 each horizontally and laterally slidable in a groove 302 provided by a plate 303 supported by frame 270. Each bar 301 carries a pin 301a, each received by a tangential groove 304 provided between the two adjacent camming members 305 integral with a plate 306 rotatably supported by the frame 270. Plate 306 is held down upon the frame 270 by screws 306a passing through arcuate slots 306b in plate 306 thus providing for limited movement of the plate 306. Plate 306 is provided with an arm 307 connected by pin 307a with a piston rod 308 cooperating with a piston (not shown) and a cylinder 309 mounted upon a bracket 310 attached to frame 270.

The operation of the conductor lead twisting mechanism is as follows. After the drum 84 has been indexed so as to locate an armature assembly in the position shown in Fig. 4 vertically above the twisting mechanism shown in Fig. 5, the pressure fluid is admitted to the upper end of that piston 60 whose piston rod is then connected with the work-holder 150, Station IV, Fig. 5. After the drum 84 has been thus indexed, pressure fluid is admitted to the cylinder 60 and the work-holder 150 descends, thereby causing the shaft S to be received in the central bore in shaft 277 and thereby causing the conductor bar leads $B_1$ and $B_2$ in the two circular rows to be received by the notches 275 and 278 respectively, of shaft ring 274 and shaft 277. After the armature has been located within the twisting mechanism, pressure fluid is admitted to the lower end of the cylinder 309 (Fig. 31), to cause the piston 308 to move upwardly and the plate 306 to be moved counter-clockwise and the bars 301 carrying the fingers 300 to move inwardly into the position shown in Fig. 34. Then pressure fluid is admitted to the lower end of the piston 290 (Fig. 15), in order to rotate the shafts 272 and 277 and to twist or circumferentially displace the conductor bar leads as described. The pressure fluid is automatically admitted to the upper end of the cylinder 309 in order to cause the fingers 300 to be retracted so that the armature is free to move upwardly from the twisting mechanism; then pressure fluid is admitted to the lower side of the cylinder 60 then in alignment with the twisting mechanism in order that the armature assembly will be returned to the position shown in Fig. 5. In case the return of the armature to the position shown in Fig. 5 should be resisted by the frictional engagement of the commutator bar ends with the twisting mechanisms, assistance is afforded by an ejector rod 310 connected with a piston, not shown, and a cylinder 311 attached to the frame 291. In order that the piston rod 310 may be moved upwardly, the pressure fluid is, of course, admitted to the lower end of the cylinder 311. After the armature assembly has returned to the position shown in Fig. 5, pressure fluid is admitted to the upper end of cylinder 311 in order that the ejector rod 310 may move downwardly and fluid pressure is admitted to the lower end of cylinder 290, (Fig. 15) in order that the piston rod head 293 may move upwardly to return the levers 285 and 287 and their associated shafts 272 and 277 to normal position ready to receive the leads of the next armature assembly to be operated upon.

STATION V

*Commutator conveyor and associated apparatus for assembling commutator with armature shaft*

Referring principally to Figs. 6 and 36 through 40, the shaft 146 is supported in bearings 320 provided by a frame 321, attached to base 50. Shaft 146 drives a gear 322, meshing with gear 323 fixed to a shaft 324, journalled in a bearing 325, mounted in a frame 326, mounted on frame 321. Frame 326 provides a channel 327 for receiving a conveyor chain 328, meshing with a driving sprocket 329 attached by screws 330 to a disc 331, keyed to shaft 324 at 332. Chain 328 carries a plurality of equi-distance holder plates 333 which ride along straight track rails 334, joined by arcuate rails 334a, 334b and 334c. Thus, one continuous track is provided as shown in Fig. 8.

Track rail members are supported on angle bars such as 335 in Figs. 38 and 39 also Fig. 1. These angle bars and rails tie together an end supporting pedestal 336, an intermediate supporting pedestal 337, and the frame 326.

Referring to Figs. 38 and 39, the pedestal 336 supports a bracket 338 upon which a bearing bracket 339 is horizontally adjusted, said bracket being guided by ways 338a of the bracket 338 and held in these ways by plates 338b. The bearing bracket 339 provides bearings 340 for a shaft 341 carrying a sprocket 342 around which the chain 328 passes. An adjusting screw 343 extends through a plain hole in the bracket 338 and is threadedly connected at 344 with the bracket 339. By turning the screw 343 clockwise as viewed in direction of the arrow 345 and Fig. 38 and Fig. 8, the shaft 341 is caused to move toward the left in Fig. 38 or downwardly in Fig. 8 in order to tighten the chain 328. The track section 334c associated with the bracket 339 is mounted on a bent angle bar 335c so that this track section 334c may move with the bracket 339. A small gap between the track section 334 and 334c is permitted in order to allow for the adjustment of bracket 339.

The intermediate pedestal 337 (Fig. 40) supports a bracket 350 providing bearings 351 and 352 for shafts 353 and 354 respectively upon which sprockets 355 and 356 are received and mounted. These sprockets 355, 356 serve to guide the chain 328 around a corner so that the commutator loading station where the operator is located for the purpose of placing commutators upon the work holder 333 (Fig. 8) can be brought in close to the paper strip holders 236 at Station III. Therefore, one attendant may load paper strips P upon paper strip holder 236 at Station III and also place commutators upon the workholders 333 for conveyance to Station V.

Each commutator workholder 333 includes a ring 360 attached to a plate 333, the central opening in the ring 360 being large enough to receive the commutator as shown in Fig. 6. The ring 360 is provided with three prongs 361, adapted to be received between certain riser bars 371 of the commutator. Therefore, each ring 360 locates a commutator 370 in a certain position angularly with respect to the track 334.

The commutator conveyor moves linearly the distance between adjacent workholders 333 during each indexing movement of the drum 84. At the end of each indexing movement, a workholder 333 so locates a commutator 370 that the tubular sleeve 372 of the commutator will be in vertical alignment below the armature shaft S which is located by a workholder 150. In order to adjust the commutator conveyor so that the alignment of the commutator 370 with an armature shaft S will take place at the end of each indexing operation of drum 84, an adjustment is provided between the shaft 324 driven by the means which drives the drum 84 and the sprocket 329 (Fig. 36). For this purpose, the disc 331 is provided with arcuate slots 331a Fig. 8, through which the screws 330 pass. By loosening all the screws 330, the chain 328 can be moved manually in order to locate a commutator 370 in vertical alignment below an armature shaft S. Then the screws 330 can be tightened to maintain this adjustment between the commutator conveyor and the drum 84.

As stated before, at the end of each indexing operation, pressure fluid is admitted simultaneously into all of the upper ends of all the cylinder 60 to cause the workholders 150 to descend simultaneously. Therefore, the workholder 150 in vertical alignment with the commutator 370 (Fig. 6) will descend to cause the armature shaft S to be pressed through the commutator core or sleeve 372. Thus the commutator is pressed-fitted on the shaft S. When the armature workholder 150 returns to the position shown in Fig. 6, the commutator which was at position 370, will be carried with the armature assembly to position 370'.

STATION VI

*Crimping apparatus*

The apparatus for bending or crimping the commutator riser tangs around the armature conductor bar end is shown principally in Figs. 7, 41 to 45.

At the end of an indexing movement of the drum 84 an armature work holder 150 will be located in vertical alignment with the apparatus which performs the crimping operation shown in Fig. 7. In this position of the work holder the armature shaft S, Fig. 39, is located in alignment with the central hole 380 in a block 381 having a recess 382 for receiving the commutator 370 which has been mounted on the shaft S at the commutator assembly Station V, Fig. 6. The block 381 is provided with an annular row of notches 383 each for receiving a pair of radially aligned bar ends $B_1$ and $B_2$. Block 381 is mounted upon a frame 384 and is located by a plate 385 also mounted upon the frame 384. Plate 385 is provided with grooves 386 which guide for radial movement bars 387 having crimping ends 388 adapted to engage the commutator riser bars 371 and bend them from the position shown in Fig. 44 to that shown in Fig. 45 so that two commutator riser bars located on each side of a commutator segment 374 will clamp a pair of conductor bar ends $B_1$ and $B_2$ to the segment. Each bar 387 is provided with a bifurcated end 389 supporting a roller 390 engageable with the camming surface 391 of a cam ring 392 received within an annular channel 393 provided by the frame 384. Each bar 387 is urged outwardly by spring 394 confined in a recess 395 provided by the plate 385 and surrounding a stud 396 carried by a lug 397 of the bar 387. Thus the roller 390 is urged into engagement with the cam surface 391 of ring 392.

Ring 392 is attached to rods 397 supported for vertical sliding movement by bearing bosses 398 integral with frame 384. The rods 397 are attached to a cross head 399 connected by a pin 400 with an apertured link 401 threadedly connected by a turn buckle 402 with a piston rod 403 connected with a piston shown enclosed within a cylinder 404 supported by frame 405 attached to base 50 and supporting the frame 384. By rotating the turn buckle 402 the distance between the pin 400 and the piston within cylinder 404 can be varied and hence the normal position of the ring 392 can be varied. When this adjustment is made the parts are locked in position by nuts 401a and 403a.

The block 381 and the plate 385 and the sliding bars 387 are retained in position by a cover 410 attached to frame 384 by screws 410a. Within a recess provided therein, frame 410 supports a plate 411 providing radial slots 412 for the sliding movement of pairs of bars 413 and 414 which are riveted together at 415, Fig. 41. Each bar 414 is adapted to move radially against a pair of conductor bar ends $B_1$ and $B_2$ as shown in Fig. 44 to press these bar ends firmly against a commutator segment while the risers 372 are being crimped thereover. Each bar 413 has a rack portion 413a (Fig. 41) for receiving a spiral worm 416 integral with an annular plate 417 rotatably supported by the plate 411 and secured thereon by a ring 418 and screws 418a (Fig. 14). As shown in Fig. 14, plate 417 is provided with a handle 420 connected by link 421 with a piston rod 422 connected with a piston within a cylinder 423 mounted upon bracket 424 attached to frame 405.

After the armature assembly has been located, as shown in Fig. 39, in vertical alignment with the crimping apparatus, the work holder 150 descends to cause the shaft S to enter the central hole 380 of block 381, to cause the commutator 370 to rest upon the block 381 and to cause the bar ends $B_1$ and $B_2$ to be received by the notches 383 provided by the block 381. When the downward movement of the armature assembly has been completed, pressure fluid is admitted into the cylinder 423 to cause the piston 422 rod to move downwardly (Fig. 14) and to cause the plate 417 to rotate counter-clockwise thereby causing the bars 414 to engage the pairs of conductor bar ends $B_1$ and $B_2$ in the manner shown in Fig. 44. Following the movement of the bars 414 into engagement with the armature conductors, pressure fluid is admitted to the bottom of cylinder 404 (Fig. 41) to cause the cam ring 392 to move upwardly to cause the bar ends 388 to move from the position shown in Fig. 44 to that shown in Fig. 45, thereby causing the commutator riser tangs 372 to be bent around the series of conductor bar ends $B_1$ and $B_2$. Following this operation, pressure fluid is automatically admitted at the upper end of cylinder 404 to cause the cam ring 392 to move downward thereby permitting the spring 395 to return the bars 387 to normal position shown in Fig. 43. Then pressure fluid is admitted to the lower end of cylinder 423 (Fig. 14) to cause the plate 417 to be rotated clockwise in order to retract the bars 414 from the position shown in Fig. 44 to that shown in Fig. 42. Then pressure fluid is admitted to the lower end of that cylinder 60 controlling a work holder 150 then at Station VI (Figs. 7 and 39) in order that the completed work will be returned to the position shown in Fig. 7, which shows the commutator riser tangs 372 bent around the conductor bar ends $B_1$ and $B_2$.

*Additional structural features*

The various arms 53 and 53a which are tied by the hub 52 to the central rod 51 supported centrally of the base 50, are tied to the base 50 by means of tie rods 450 connected at the upper ends with the arm extensions 55 and 56 or 56a in case of arm 53a. The lower ends of these rods 450 are attached to various frames supported by the base 50. At Station II, Fig. 9, the rods 450 are connected with the frame 190, Figs. 9 and 14. At Station III (Fig. 8) the rods 450 are connected with frame 231. At Station IV (Fig. 8) the rods 450 are connected with frame 270. At Station V (Fig. 8) the rods 450 are connected with frame 321. At Station VI (Fig. 9) the rods 450 are connected with frame 405.

Referring to Fig. 17 each work holder 150 is provided with a pilot bushing 451 for engaging a pilot rod 452 mounted in a block 453 attached to the plate 209. There are no pilot rods at any of the other stations. The engagement of the work holder 150 with the pilot rod 452 at Station IV (Figs. 5 and 17) is sufficient to control the alignment between the armature support of the various work holders with the various mechanisms which operate upon the armature at the various stations following the loading station.

Hydraulic system

Referring to Fig. 46 the construction and mode of operation of the hydraulic system will be described. The pump designated by numeral 75 in Fig. 10 comprises pump units 75a, 75b (Fig. 46) both driven by the electric motor 72 (Fig. 10). The oil or other pressure fluid is forced by the pump from the reservoir 70 into an automatic valve 78 which causes the discharge from both pumps to flow through pipe 500 until the pressure exceeds a certain amount, for example, 750 pounds per sq. inch. When the pressure exceeds this amount pump 75a continues to build up pressure in pipe 500 while pump 75b is unloaded since its outlet pipe 77b is automatically connected by valve 78 with pipe 79 which returns the oil to the reservoir 50. Pipe 500 connects with port 501 of valve 502 having also ports 503, 504 and 505. The movable valve part 506, held normally in a central position by springs 507, has a port 508 registering with port 501 at all times. In the central position of valve 506, port 509 registers with port 505, and the discharge from the pumps returns to the reservoir 70. Valve 506 has a port 513 adapted to register with port 503 when valve 506 is moved to the left. Valve 506 has a port 514 adapted to register with port 504 when valve 506 is moved toward the right.

Valve 506 is moved toward the left by the movement of a solenoid armature plunger 520 when its coil 521 is energized. Valve 506 is moved to the right by solenoid armature plunger 522 when its coil 523 is energized. Coils 521 and 523 are connected with line wire 525. Line wire 526 is connected with a rotating arm carrying the contact roller 125 (Fig. 11). Coil 521 is connected with contact 111a and coil 523 is connected with contact 111b. Contact 112 is connected with an automatic switch 527 also connected with line 525. When roller 125 engages contact 112 switch 527 will operate to automatically stop the operation of the indexing motor 104. When contact 125 which rolls around the track 110 in a counterclockwise direction, engages contact 111a solenoid coil 521 will be energized to cause valve 506 to move toward the left in order to connect ports 501 and 503. When roller 125 engages contact 111b solenoid coil 523 will be energized to cause the valve 506 to move to the right to connect ports 501 and 504.

Assuming that the indexing motor 104 has been stopped by the engagement of roller 125 with contact 112, the operator will load the workholder at Station I while the operator at Station III will load the insulating strip workholders 236 with insulating strips P (Fig. 4) and will also load the commutators 370 upon workholders 360. These workholders 360 are conveyed adjacent to the operator who sits at Station III (Fig. 1). The indexing motor is started into operation again when the operators at Stations I and III push the buttons of motor starting switches, one of which is indicated at 528 in Fig. 1. The starting circuit of motor 104 is also protected by five limit switches which respond to the upward movement of the workholders 150. Referring to Fig. 5, it will be seen that holder 150 is in the upper position; and that, when in this position, the plate 160 mounted upon it engages a roller 529 on an arm 530. This arm controls a limit switch not shown. All of the workholders 150 must be in upper position at Stations II, III, IV, V and VI before the machine can be started. At Station I (Fig. 2) the limit switch is not needed since the operator who loads the work holder 150 at that station can readily ascertain it is not in its upper position. Therefore, the operator would not press a starter button located at the loading station. If all the limit switch handles are up, the indexing motor 104 will start when the operators at Stations I and III press concurrently the starting switch buttons 528. The wiring of starter switches 528 and the limit switches controlled by arms 530 is not disclosed as such details of construction are familiar to those skilled in the art of electrically wiring motors and switches for industrial machinery. Furthermore, a detailed disclosure of this wiring would be unnecessary to the understanding of the present invention. It is sufficient to state that the indexing motor will not begin its operations until the machine operators at Stations I and III have loaded the work pieces and have pressed the starting switches concurrently. Even then, the machine will not start unless the work holders at Stations II, III, IV, V and VI are up.

The indexing motor 104 when started will index all of the work holders into the proper work stations. This indexing operation takes place while the roller 125 is being bodily moved counterclockwise from a position out of engagement with contact 112 and before it engages contact 111a. While roller 125 is engaging contact 111a solenoid coil 521 is energized and valve 506 is pushed toward the left so that ports 501 and 503 are connected. Pressure fluid then flows through pipe 530 and straight through an automatic bypass valve 531 and then out through a pipe 532 and then through branch pipes 533, 534 and 535. Pipe 535 is connected with branch pipes 536 and 537 leading, respectively, to the upper ends of the cylinders 60 at Stations II and III. Branch pipe 534 is connected with branch pipes 538 and 539 leading, respectively, to the upper ends of cylinders 60 at Stations V and VI. Pipe 533 is connected with branch pipes 540 and 541 leading, respectively, to the upper ends of cylinder 60 and 311 at Station IV. Therefore, immediately following movement of valve 506 to connect ports 501 and 503 all of the cylinders 60 receive pressure fluid at their upper ends and also the cylinder 311. Therefore, all of the workholders at Stations II to VI move down and the ejector rod 310 at Station IV moves down (see Fig. 23).

Following the movement of the pistons in these cylinders 60 and 311 downwardly, pressure builds up in the automatic valve 531. When this pressure has been raised a substantial amount, for example, 100 lbs. per sq. inch, then valve 531 operates automatically to open a passage between pipe 530 and a pipe 542 which is connected with branch pipes 543, 544 and 545. Branch pipe 543 is connected with automatic by-pass valve 546 at Station IV connected by pipe 547 with the head end of cylinder 309. The pressure fluid flows through the valve 546 and effects movement of rod 308 to the right in Fig. 46 or in such direction as to cause fingers to move radially into the spaces between conductor bar ends prior to twisting them at Station IV. Branch pipe 544 is connected with automatic bypass valve 550 connected by pipe 551 with the head end of cylinder 423. Pressure fluid is forced directly through valve 550 to cause rod 422 to move to the right in Fig. 46 or in such direction as to cause fingers to move radially inward to engage conductor bar ends before the commutator riser tangs are crimped against them at Station VI. Branch pipe 545 is connected by branch pipes 552 and 553 respectively with the head end of cylinder 225 and the bottom of cylinder 191. Pressure fluid therefore forces piston rod 227 to the right in Fig. 46 and piston rod 192 upwardly. Therefore, the radially movable fingers for engaging conductor bars adjacent the ends of armature core slots and the operation of the packing apparatus is performed concurrently at Station II.

The apparatus at Stations IV and VI are now in such condition that the twisting and crimping operations may be performed. After the rod 308 has been moved to to the right, pressure will build up in line 543 and when this pressure has been increased by 100 lbs. per sq. in. for example, valve 546 will operate automatically to place a pipe 555 in communication with pipe 543, whereupon piston rod 292 will move to the right in Fig. 46 or in such direction as to effect the twisting operation at Station IV. Likewise, at Station VI, after the rod 422 has been moved to the right pressure will build up in valve 550; and, when this pressure has been increased 100 lbs. per sq. in., valve 550 will be placed in communication with the lower end of cylinder 404, whereupon piston rod 401 will be raised to effect the crimping operation.

The operations at Stations II and V are performed simply by the downward movement of the workholders as effected by downward movement of the piston rods 61 at Stations III and V.

The various movements of the piston rods to effect the operations performed at Stations II to VI will take place while the contact roller is moving across the contact 111a. The operation of the indexing motor carries the contact roller 125 counterclockwise away from the contact 111a whereupon solenoid coil 521 is disconnected from the line thereby permitting the valve 506 to return to central position. In this position port 503 is blocked so that a certain amount of pressure will be maintained in the various cylinders while the contact roller 125 moves toward the contact 111b.

When roller 125 engages contact 111b solenoid coil 523 will be energized to cause solenoid armature plunger 522 to move toward the right to move the valve 506 toward the right in order to connect port 501 with port 504. When this occurs, the pressure of fluid will be raised in pipe 560 connecting port 504 with branch pipes 561, 562 and 563. Branch pipe 561 is connected with branch pipes 564 and 565 connected respectively with the lower end of cylinder 60 at Station V and with an automatic bypass valve 566. Valve 566 allows the pressure fluid to flow directly to branch pipes 567 and 568 connected respectively with the upper end of cylinder 404 and at the rod end of cylinder 523. Branch pipe 562 is connected with branch pipes 570 and 571 connected respectively with the lower ends of cylinders 60 at Stations II and III. Branch pipe 563 is connected by branch pipe 572 and 573 respectively with the rod end of cylinder 225 and the upper end of cylinder 191 at Station II. Therefore, it is apparent that, immediately following the connection of ports 501 and 504, the work holder rods 61 at Stations II, III and V will move upwardly and that the rod 227 at Station II and the rod 422 at Station VI will move toward the left to cause radially moving parts to be disengaged from the work. Also the rod 192 at Station II and the rod 401 at Station VI will move downwardly to retract from the work the necking down devices at Station II and the crimping devices at Station VI. At Station II the retraction of the work holder from the necking down devices can take place concurrently with retraction of radially moving parts as well as longitudinally moving parts associated with the necking down devices. At Station VI it is necessary to retract from the work the radially moving parts and the longitudinally moving parts associated with the crimping apparatus before raising the work holder. Therefore, the automatic valve 566 is provided in order that an increase in pressure in pipe 565 will be required before pressure fluid can be admitted to the lower end of cylinder 60 at Station VI. This increase in pressure comes after the rods 422 and 401 have been restored to normal position. When this pressure increase amounts to 100 lbs. per sq. inch, valve 566 establishes a communication between pipe 565 and pipe 575 to admit pressure fluid at the lower end of cylinder 60 at Station VI.

Pipe 564 is connected with a branch pipe 580 connected by an automatic valve 581 with pipe 582 leading to the rod end of cylinder 309. Pipe 582 is connected by branch pipe 583 with automatic valve 584 connected by pipe 585 with the rod end of cylinder 290. Concurrently with the admission of pressure fluid to the lower ends of cylinder 60 at Stations II, III and V pressure fluid is admitted by valve 581 and pipe 582 to the rod end of cylinder 309, in order that the radially movable bars associated with the twisting apparatus at Station IV may be retracted from the work ahead of restoration of any other device to normal or nonoperating condition. After restoration of rod 308 has taken place, there will be an increase in pressure in valve 581; and, when this pressure exceeds 100 lbs. per sq. in., valve 581 will establish connection between pipe 580 and a pipe 590 connected by branch pipes 591 and 592 respectively at the lower ends of cylinders 311 and 60 at Station IV. Then the work holder at Station IV will be elevated and will be assisted in its elevation by upward movement of rod 310. After this has occurred there will be a pressure increase in pipes 582 and 583; and, when this pressure has increased to 200 lbs. per sq. in. in excess of that which was required to move rod 308 to the left or 100 lbs. in excess of that which was required to move rod 310 upwardly and rod 61 upwardly, valve 584 will place pipe 585 in communication with pipe 583 whereupon rod 292 will be moved toward the left or in such direction as to cause the rotating members of the twisting apparatus to be restored to normal position preparatory to receiving new work.

The operations of retracting the work in restoring the apparatus to normal condition for receiving new work are preformed while the relay 125 is in engagement with contact 111b. The indexing motor continues to move relay 125 bodily counterclockwise until it engages the contact 112. When this occurs automatic switch 527 will operate to cause the indexing motor to stop in order that the operator at Station I may take out the completed work and load in uncompleted work. As stated before while the operator at Station I is unloading and reloading, the operator at Station III is placing paper strips upon the paper conveyor and commutators upon the commutator conveyor, both of said conveyors being located within convenient reach of the operator as he sits at Station III.

The various operations of moving the work toward the apparatuses and the movements of the apparatuses to perform the work and the retraction of the work after the apparatuses have worked upon it and the restoration of the working parts of the apparatuses to normal condition are performed in a certain sequence. At Station II the work is advanced into engagement with the necking apparatus before the apparatus starts operating. Rod 61 at Station II moves downwardly then rods 227 and 192 move respectively toward the right and upwardly in Fig. 46. After the necking operation is performed these rods are returned concurrently to normal position.

At Station III the movement of the piston rod 61 downwardly effects the assembling of the insulation strip P with the armature assembly; and upward movement of rod 61 carries the work upwardly with the strip P assembled thereon. Likewise, at Station V, downward movement of the rod 61 effects the forcing of the armature shaft through the commutator core; and upward movement of the rod 61 causes the armature assembly to move upwardly with the commutator assembled therewith.

At Station IV, where the conductor bar leads are twisted, the work is advanced toward the twisting apparatus by the downward movement of rod 61 accompanied by downward movement of rod 310. Then rod 308 moves toward the right to advance certain bars radially into contact with the armature assembly. After that the rod 292 moves toward the right to effect the movement of the rotary twisting members. After the twisting operation has been performed, rod 308 is first restored to normal position to retract the radially movable bars from the armature bars. Then rods 310 and 61 are automatically raised in order to retract the work. Then rod 292 is moved toward the left or in such direction as to restore the rotary twisting members to normal condition.

At station VI the rod 61 first moves downwardly to carry the work toward the crimping apparatus. Then the rod 422 moves toward the right or in such direction as to cause radially movable bars to engage the armature conductors near where they are received by commutator riser tangs. Then the rod 401 moves upwardly to effect the crimping of the commutator riser tangs around the commutator bar ends. After the crimping operation has been performed and rods 401 and 422 are restored first to normal conditions concurrently. Then the rod 61 at Station VI moves upwardly to retract the work.

While the embodiment of the present invention as herein disclosed, constitutes a preferred form, it is to be understood that other forms might be adopted, all coming within the scope of the claims which follow.

What is claimed is as follows:

1. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively at various stations, apparatus at a station for bending the armature bar ends toward the armature shaft, apparatus at a station for locating a band of strip insulation in alignment with the annular space between annular rows of armature bar ends and for effecting the assembly of the band with the armature as the result of relatively bodily movement between a work holder and the apparatus axially of the armature, means for effecting relatively bodily movement between the work holders and said apparatuses, axially of the armatures, means for operating such apparatus as changes the shape of a part of the armature assembly, and control mechanism for effecting the operation of said means in sequence.

2. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for locating a band of strip insulation in alignment with the annular space between annular rows of armature bar ends and for effecting the assembly of the band with the armature as the result of relatively bodily movement between a work holder and the apparatus axially of the armature, apparatus at a station for displacing the annular rows of armature bar ends circumferentially in opposite directions, means for effecting relatively bodily movement between the work holders and said apparatuses, axially of the armatures, means for operating such apparatus as changes the shape of a part of the armature assembly, and control mechanism for effecting the operation of said means in sequence.

3. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for displacing the annular rows of armature bar ends circumferentially in opposite directions, apparatus at a station for locating commutator having a tubular core in alignment with an armature shaft, said commutator having spaced riser tangs associated with each commutator bar, the spaces between the riser tangs of each bar being located by the apparatus in alignment with armature bars to be received by said spaces as the result of relative bodily movement between the armature holder and the apparatus axially of the armature, means for effecting relatively bodily movement between the work holders and said apparatuses, axially of the armatures, means for operating such apparatus as changes the shape of a part of the armature assembly, and control mechanism for effecting the operation of said means in sequence.

4. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for locating commutator having a tubular core in alignment with an armature shaft, said commutator having spaced riser tangs associated with each commutator bar, the spaces between the riser tangs of each bar being located by the apparatus in alignment with armature bars to be received by said spaces as the result of relative bodily movement between the armature holder and the apparatus axially of the armature, apparatus at a station for bending the pairs of riser tangs around the armature ends received between them, means for effecting relatively bodily movement between the work holders and said apparatuses, axially of the armatures, means for operating such apparatus as changes the shape of a part of the armature assembly, and control mechanism for effecting the operation of said means in sequence.

5. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armatures supporting work holders mounted upon the conveyor, a drive for intermittently moving the conveyor to cause the work holders to be carried successively to various stations and the armatures to be located in alignment with apparatuses located, respectively, at various stations, apparatus at a station for bending the armature bar ends toward the armature shaft, apparatus at a station for displacing the annular rows of armature bar ends circumferentially in opposite directions, means for effecting relatively bodily movement between the work holders and said apparatuses, axially of the armatures, means for operating such apparatus as changes the shape of a part of the armature assembly, and control mechanism for effecting the operation of said means in sequence.

6. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for bending the armature bar ends toward the armature shaft, apparatus at a station for locating a band of strip insulation in alignment with the annular space between annular rows of armature bar ends and for effecting the assembly of the band with the armature as the result of relatively bodily movement between a work holder and the apparatus axially of the armature, apparatus at a station for displacing the annular rows of armature bar ends circumferentialy in opposite directions, means for effecting relatively bodily movement between the work holders and said apparatuses, axially of the armatures, means for operating such apparatus as changes the shape of a part of the armature assembly, and control mechanism for effecting the operation of said means in sequence.

7. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for locating a band of strip insulation in alignment with the annular space between annular rows of armature bar ends and for effecting the assembly of the band with the armature as the result of relatively bodily movement between a work holder and the apparatus axially of the armature, apparatus at a station for displacing the annular rows of armature bar ends circumferentially in opposite directions, apparatus at a station for locating commutator having a tubular core in alignment with an armature shaft, said commutator having spaced riser tangs associated with each commutator bar, the spaces between the riser tangs of each bar being located by the apparatus in alignment with armature bars to be received by said spaces as the result of relative bodily movement between the armature holder and the apparatus axially of the armature, means for effecting relatively bodily movement between the work holders and said apparatuses, axially of the armatures, means for operating such apparatus as changes the shape of a part of the armature assembly, and control mechanism for effecting the operation of said means in sequence.

8. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for displacing the annular rows of armature bar ends circumferentially in opposite directions, apparatus at a station for locating commutator having a tubular core in alignment with an armature shaft, said commutator having spaced riser tangs associated with each commutator bar, the spaces between the riser tangs of each bar being located by the apparatus in alignment with armature bars to be received by said spaces as the result of relative bodily movement between the armature holder and the apparatus axially of the armature, apparatus at a station for bending the pairs of riser tangs around the armature ends received between them, means for effecting relatively bodily movement between the work holders and said apparatuses, axially of the armatures, means for operating such apparatus as changes the shape of a part of the armature assembly, and control mechanism for effecting the operation of said means in sequence.

9. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for bending the armature bar ends toward the armature shaft, apparatus at a station for displacing the annular rows of armature bar ends circumferentially in opposite directions, apparatus at a station for locating commutator having a tubular core in alignment with an armature shaft, said commutator having spaced riser tangs associated with each commutator bar, the spaces between the riser tangs of each bar being located by the apparatus in alignment with armature bars to be received by said spaces as the result of relative bodily movement between the armature holder and the apparatus axially of the armature, means for effecting relatively bodily movement between the work holders and said apparatuses, axially of the armatures, means for operating such apparatus as changes the shape of a part of the armature assembly, and control mechanism for effecting the operation of said means in sequence.

10. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for bending the armature bar ends toward the armature shaft, apparatus at a station for locating a band of strip insulation in alignment with the annular space between annular rows of armature bar ends and for effecting the assembly of the band with the armature as the result of relatively bodily movement between a work holder and the apparatus axially of the armature, apparatus at a station for displacing the annular rows of armature bar ends circumferentially in opposite directions, apparatus at a station for locating commutator having a tubular core in alignment with an armature shaft, said commutator having spaced riser tangs associated with each commutator bar, the spaces between the riser tangs of each bar being located by the apparatus in alignment with armature bars to be received by said spaces as the result of relative bodily movement between the armature holder and the apparatus axially of the armature, means for effecting relatively bodily movement between the work holders and said apparatuses, axially of the armatures, means for operating such apparatus as changes the shape of a part of the armature assembly, and control mechanism for effecting the operation of said means in sequence.

11. A machine for performing a sequence of operations upon an armature assembly comprising a shaft, a slotted core mounted on the shaft and bar windings, assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for locating a band of strip insulation in alignment with the annular space between annular rows of armature bar ends and for effecting the assembly of the band with the armature as the result of relatively bodily movement between a work holder and the apparatus axially of the armature, apparatus at a station for displacing the annular rows of armature bar ends circumferentially in opposite directions, apparatus at a station for locating commutator having a tubular core in alignment with an armature shaft, said commutator having spaced riser tangs associated with each commutator bar, the spaces between the riser tangs of each bar being located by the apparatus in alignment with armature bars to be received by said spaces as the result of relative bodily movement between the armature holder and the apparatus axially of the armature, apparatus at a station for bending the pairs of riser tangs around the armature ends received between them, means for effecting relatively bodily movement between the work holders and said apparatuses, axially of the armatures, means for operating such apparatus as changes the shape of a part of the armature assembly, and control mechanism for effecting the operation of said means in sequence.

12. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for bending the armature bar ends toward the armature shaft, apparatus at a station for displacing the annular rows of armature bar ends circumferentially in opposite directions, apparatus at a station for locating commutator having a tubular core in alignment with an armature shaft, said commutator having spaced riser tangs associated with each commutator bar, the spaces between the riser tangs of each bar being located by the apparatus in alignment with armature bars to be received by said spaces as the result of relative bodily movement between the armature holder and the apparatus axially of the armature, apparatus at a station for bending the pairs of riser tangs around the armature ends received between them, means for effecting relatively bodily movement between the work holders and said apparatuses, axially of the armatures, means for operating such apparatus as changes the shape of a part of the armature assembly, and control mechanism for effecting the operation of said means in sequence.

13. A machine for performing a sequence of operations upon an armature assembly comprising a shaft, a slotted core mounted on the shaft and bar windings assembled with the core, the bar ends extending from the core in concentric annular rows, said machine comprising, in combination, a work holder conveyor, a plurality of armature supporting work holders mounted upon the conveyor, a drive for intermittently moving the conveyor to cause the work holders to be carried successively to various stations and the armatures to be located in alignment with apparatuses located, respectively, at various stations, apparatus at a station for bending the armature bar ends toward the armature shaft, apparatus at a station for locating a band of strip insulation in alignment with the annular space between annular rows of armature bar ends and for effecting the assembly of the band with the armature as the result of relatively bodily movement between a work holder and the apparatus axially of the armature, apparatus at a station for displacing the annular rows of armature bar ends circumferentially in opposite directions, apparatus at a station for locating commutator having a tubular core in alignment with an armature shaft, said commutator having spaced riser tangs associated with each commutator bar, the spaces between the riser tangs of each bar being located by the apparatus in alignment with armature bars to be received by said spaces as the result of relative bodily movement between the armature holder and the apparatus axially of the armature, apparatus at a station for bending the pairs of riser tangs around the armature ends received between them, means for effecting relatively bodily movement between the work holders and said apparatuses, axially of the armatures, means for operating such apparatus as changes the shape of a part of the armature assembly, and control mechanism for effecting the operation of said means in sequence.

14. A machine for performing a sequence of operations upon an armature assembly comprising a shaft, a slotted core mounted on the shaft and bar windings assembled with the core, said machine comprising, in combination, a work holder conveyor; work holders mounted on the conveyor for holding armatures with their shafts extending transversely to the direction of movement of the conveyor, a drive for intermittently moving the conveyor to cause the armatures to be carried successively to various stations, apparatuses at the stations for performing operations upon the armature, devices each located at an operating station and engageable with the work holder as it is carried to the station, said devices operable to cause the work holders to move axially of the armatures to carry the armatures into operative engagement with the apparatuses, means for operating said devices, means for operating the apparatuses, and control mechanism for effecting the operation of said means in sequence.

15. A machine according to claim 14 in which each of said devices for moving the armatures axially when they arrive at the operating stations includes a fluid pressure operated rod.

16. A machine according to claim 14 in which each of said devices for moving the armatures axially when they arrive at the operation stations are stationary double acting fluid pressure cylinders each operating with a piston and piston rod, the rod having a head received by a T-slot at one end of the work holder.

17. A machine according to claim 14 in which the work holder conveyor is a rotary drum supporting the work holders for linear movement parallel to the axis of rotation of the drum, and in which each of said devices includes a power operated rod for engaging the work holder to axially move the armature carried thereby while the work holder is at an operating station.

18. A machine according to claim 14 in which the work holder conveyor is a drum rotating on a vertical axis and supporting the work holders for linear movement vertically, in which each of said devices includes a power operated rod for engaging and supporting the work holder while the work holder is at an operating station and for moving the armature axially, and in which the work holders are supported by arcuate track segments while moving between stations.

19. A machine according to claim 14 in which the work holder conveyor is a rotary drum supporting the work holders for linear movement parallel to the axis of rotation of the drum, in which each of said devices includes a stationary double acting fluid pressure cylinder cooperating with a piston and a piston rod, the rod having a head received by a T-slot at one end of the work holder, and in which the work holders are supported by arcuate track segments while moving between stations.

20. A machine for performing a sequence of operations upon an armature, and comprising, in combination, a base, a vertical rod supported at its lower end by the base, a hub supported by the rod at its upper end, a plurality of arms fixed at the inner ends to the hub and extending radially therefrom, a plurality of apparatuses for performing operations upon the armatures, each apparatus having a supporting frame mounted upon the base, vertical rods supported at their lower ends by the apparatus frames and supporting, at their upper ends, the outer ends of said arms, an armature conveyor located between the base and the arms and supported by the base for rotation around the vertical rod, armature work holders carried by the conveyor and guided thereby for vertical movement, means carried by the arms for engaging the work holders as they arrive at operating stations and for moving the armatures supported thereby into engagement with the apparatuses, and means for intermittently moving the conveyor, to carry the armatures successively to various operating stations.

21. A machine according to claim 20 in which the armature conveyor is fixed to a tubular shaft rotatably supported by the base and surrounding the vertical rod, and in which the shaft is driven through a Geneva-gear movement housed by the base.

22. A machine according to claim 20, which is provided with means for conveying to a station parts which are assembled with the armature as the result of vertical movement of the armature at that station, and in which the parts conveyor is operated by the means for intermittently moving the armature conveyor.

23. A machine according to claim 20, which is provided with two conveyors for conveying to different stations parts which are to be assembled at those stations with armatures there located, said assembling resulting from vertical movement of the armatures at those stations, in which the parts conveyors have adjacent loading stations, and in which the parts conveyors are operated by the means for intermittently moving the armature conveyor.

24. A machine according to claim 20, which is provided with means for conveying to a station parts which are assembled with the armature as the result of vertical movement of the armature at that station, in which the armature conveyor is fixed to a tubular shaft rotatably supported by the base and surround the vertical rod, and in which the parts conveyor is driven by gearing driven by the tubular shaft.

25. A machine according to claim 20 in which the base provides a housing for the conveyor moving means, and in which a base housing cover provides a circular track receiving trunnions which vertically support the armature conveyor.

26. A machine for performing a sequence of operations upon an armature assembly including bar windings assembled on a core, said machine comprising, in combination, an armature conveyor, a plurality of armature carrying work holders mounted upon the conveyor, a drive for intermittently moving the conveyor in order to bring the armatures successively into various stations, armature forming apparatuses located at various stations with which the armatures are successively brought into alignment by the conveyor, said apparatuses having devices for shaping the bar leads or for fastening their ends to a commutator, means for effecting relatively bodily movement between the work holders and apparatuses to bring the armatures into position to be operated upon by said devices, means for effecting movement of said devices to shape or to fasten the bar leads, and a mechanism controlled by the conveyor drive for causing said means to operate in a predetermined sequence during the time in which the conveyor is at rest.

27. A machine for performing a sequence of operations upon an armature assembly including bar windings assembled cn a core, said machine comprising, in combination, an armature conveyor, a plurality of armature carrying work holders mounted upon the conveyor, a drive for intermittently moving the conveyor in order to bring the armatures successively into various stations, armature forming apparatuses located at various stations with which the armatures are successively brought into alignment by the conveyor, said apparatus having devices movable into engagement with armature bars to limit movement of portions thereof while the bar leads are being formed or their ends are being fastened, said apparatus having devices for shaping the bar leads or for fasting their ends to a commutator, means for effecting relative bodily movement between the work holders and apparatuses to bring the armatures into position to be operated upon by said devices, means for effecting movement of said bar movement limiting devices, means for effecting movement of the devices for shaping or fastening the bar leads, and a mechanism controlled by the conveyor drive for causing said means to operate in a predetermined sequence during the time in which the conveyor is at rest.

28. For use with a machine for performing a sequence of operations upon an armature assembly including bar windings assembled on a core with bar leads extending from the core in two spaced, concentric, annular rows, apparatus for assembling a band of strip insulating material between the rows of bar leads, said apparatus comprising a block providing grooves for receiving the inner row of bar leads, means for releasably holding the strip as a band around the block, and stripper bars engaging the block at their side edges and having their end portions engageable with the strip, lost motion connections between the block and the stripper bars being provided by these bars, relative motion between the block and the stripper bars axially of the armature while the core is in contact with the block resulting in the transfer of the strip to the annular space between the annular rows of bar leads.

29. For use with a machine for performing a sequence of operations upon an armature assembly including bar winding assembled on a core with bar leads extending from the core in two spaced, concentric, annular rows, apparatus for assembling a band of strip insulating material between the rows of bar leads, said apparatus comprising a work holder frame providing a circular recess coaxial with the armature, a circular block concentrically disposed within the recess and adapted to receive an armature, said block having longitudinal grooves for receiving the inner row of bar leads, means yieldingly supporting the block within the frame recess, means for releasably holding a strip of insulating material as a band around the block, stripper bars located between the block and frame and guided thereby for longitudinal movement so that their ends will engage the band, lugs provided by the stripper bars normally in spaced relation with respect to a surface of the block in order to provide lost motion connections between the block and these bars, and means yieldingly resisting movement of the stripper bars, relative motion between the block and the stripper bars axially of the armature while the core is in contact with the block resulting in the transfer of the strip to the annular space between the annular rows of bar leads.

30. For use with a machine for performing a sequence of operations upon an armature assembly including bar windings assembled in a core with bar leads extending from the core in two spaced, concentric, annular rows, the bar lead ends being closer to the armature axis than when the bars emerge from the core whereby the space between rows of bar leads includes a portion which flares out toward the adjacent core end, apparatus for placing a band of strip insulating material between the rows of bar leads and in said flaring space, said apparatus comprising, a work holder frame providing a circular recess coaxial with the armature, a circular block concentrically disposed within the recess and adapted to receive an armature, said block having longitudinal grooves for receiving the inner row of bar leads, means yieldingly supporting the block within the frame recess, means for releasably holding a strip of insulating material as a band around the block, stripper bars located between the block and frame and guided thereby for longitudinal movement so that their ends will engage the band, the stripper bar ends being normally located in different planes at right angles to the axis of the central block whereby the band may initially rest upon the ends of stripper bands in oblique disposition relative to the block axis, lugs provided by the stripper bars at varying distances from a surface of the block in order to provide such lost motion connections between the block and the stripper bars that, as the result of motion of the block relatively to the bars, the band engaging ends of the stripper bars are brought into the same plane at right angles to the axis of the block, and springs individually urging the bars in one direction against a stationary part and resisting movement of the bars by the block in the opposite direction, movement of the block with the armature in said opposite direction relative to the stripper bar causing the insulating band to be transferred to the flaring annular space between the bar leads.

31. An insulating band holder and transfer device for use in manufacturing armatures having bar windings mounted upon a core with the bar leads extending from the core in two spaced, concentric, annular rows, said device comprising, in combination, a cylindrical support adapted to be engaged by an armature core end and having grooves for receiving the inner row of bar leads, a base, means for yieldingly mounting the support upon the base, means for releasably securing an insulating strip as a band around the support, and means operable in response to movement of the support and armature relative to the base and axially of the armature for transferring the band to the annular space between the rows of bar leads.

32. An insulating band holder and transfer device for use in manufacturing armatures having bar windings mounted upon a core with the bar leads extending from the core in two spaced, concentric, annular rows, said device comprising, in combination, a cylindrical support adapted to be engaged by an armature core end and having grooves for receiving the inner row of bar leads, a base, means for yieldingly mounting the support upon the base, means for releasably securing the insulating strip as a band obliquely formed around the support, and means operable in response to movement of the support and armature relative to the base and axially of the armature for progressively moving portions of the band into the annular space between the rows of bar leads and for causing the band to be changed from oblique to normal formation.

LORA E. POOLE.
ERNEST R. FAUSSET.